United States Patent [19]

Villarreal et al.

[11] Patent Number: 5,253,329
[45] Date of Patent: Oct. 12, 1993

[54] NEURAL NETWORK FOR PROCESSING BOTH SPATIAL AND TEMPORAL DATA WITH TIME BASED BACK-PROPAGATION

[75] Inventors: James A. Villarreal, Friendswood; Robert O. Shelton, Houston, both of Tex.

[73] Assignee: The United States of America as represented by the Administrator of the National Aeronautics and Space Administration, Washington, D.C.

[21] Appl. No.: 813,556

[22] Filed: Dec. 26, 1991

[51] Int. Cl.$^5$ ............................................... G06F 15/18
[52] U.S. Cl. ........................................... 395/24; 395/23
[58] Field of Search .................................... 395/24, 23

[56] References Cited

U.S. PATENT DOCUMENTS

| | | | |
|---|---|---|---|
| 4,326,259 | 4/1982 | Cooper et al. | 395/24 |
| 4,536,844 | 8/1985 | Lyon | 364/487 |
| 4,752,906 | 6/1988 | Kleinfield | 364/807 |
| 4,858,147 | 8/1989 | Conwell | 364/513 |
| 4,874,963 | 10/1989 | Alspector | 395/24 |
| 4,906,865 | 3/1990 | Holler | 307/353 |
| 4,914,708 | 4/1990 | Carpenter et al. | 382/14 |
| 4,926,180 | 5/1990 | Anastassiou | 395/27 |
| 4,931,868 | 6/1990 | Kadar | 358/105 |
| 4,937,872 | 6/1990 | Hopfield et al. | 395/24 |
| 4,979,124 | 12/1990 | Sachse et al. | 364/507 |
| 4,979,126 | 12/1990 | Pao et al. | 395/24 |
| 4,997,249 | 3/1991 | Berry et al. | 350/96.15 |
| 5,067,095 | 11/1991 | Peterson et al. | 395/24 |
| 5,113,483 | 5/1992 | Keeler et al. | 395/23 |

OTHER PUBLICATIONS

Gori et al, "Temporal Pattern Recognition Using EBPS", EURPSIP Workshop 1990-*Neural Networks*, Feb. 1990, pp. 69-80.

"Why Neural Networks Don't Yet Fly: Inquiry into the Neurodynamics of Biological Intelligence" IEEE Iternational Conference on Neural Networks, San Diego, Calif., 1988, W. J. Freeman.

Nonlinear Dynamics of Pattern Formation and Pattern Recognition in the Rabbit Olfactory Bulb, Elsevier Science Publishers B. V., North-Holland Physics Publishing Division, 0167-2789, 1986.

"Sunspot Predition Using Neural Networks", *SOAR* '89-Third Annual Workshop on Automation and Robotics, 1987, J. A. Villarreal and P. Baffes.

"Learning Internal Representations by Error Propagation", in D. E. Rumelhart & J. L. McClelland (Eds.), Parallel-Distributed Processing: *Explorations in the Microstructure of Cognition* (vol. 1) (pp. 318-362) MIT Press, 1986, Cambridge, Mass., D. E. Rumelhart et al.

"Serial Order: A Parallel Distributed Processing Approach", *ICS Report 8604*, Institute for Cognitive Science, Univ. of Calif., San Diego, Calif. 1986, M. I. Jordan.

(List continued on next page.)

*Primary Examiner*—Allen R. MacDonald
*Attorney, Agent, or Firm*—Hardie R. Barr; Guy M. Miller; Edward K. Fein

[57] ABSTRACT

Neural network algorithms have impressively demonstrated the capability of modelling spatial information. On the other hand, the application of parallel distributed models to processing of temporal data has been severely restricted. The invention introduces a novel technique which adds the dimension of time to the well known back-propagation neural network algorithm. In the space-time neural network disclosed herein, the synaptic weights between two artificial neurons (processing elements) are replaced with an adaptable-adjustable filter. Instead of a single synaptic weight, the invention provides a plurality of weights representing not only association, but also temporal dependencies. In this case, the synaptic weights are the coefficients to the adaptable digital filters.

42 Claims, 9 Drawing Sheets

OTHER PUBLICATIONS

"Reading the Structure of Brains", *Network Computation in Neural Systems,* vol. 1, No. 1, Jan. 1980, V. Braitenberg.

"Neural Networks Primer Part VI", *AI Expert,* pp. 41-46, 1989, Miller Freeman Publications, San Francisco, Calif., Maureen Caudill.

"The Tempo-Algorithm: Learning in a Neural Network with Variable Time-Delays", *JJCNN-90-Wash.,* D.C., Jan. 15-19, 1990, vol. 1, pp. I-597-I-600, Ulrich Bodenhausen.

"Temporal-Spatial Coding Transformation: Conversion of Frequency-Code to Place-Code via a Time-Delayed Neural Network", IJCNN-90 proceedings Jan. 1990, pp. I-130-I-133, David C. Tam.

"A Connectionist Approach to the Processing of Time Dependent Medical Parameters" IJCNN-90 proceedings Jan. 1990, pp. II-575-II-578, Barry Blumeenfeld, MD.

"Spatio-Temporal vs. Spatial Pattern Recognition by the Neocognitron", IJCNN-90 proceedings Jan. 1990, pp. II-279-II-282, Kunihiko Fukushima.

"Self-Organizing Neural Architectures for Motion Perception, Adaptive Sensory-Motor Control, and Associative Mapping", IJCNN-90 proceedings Jan. 1990, pp. II-26-II-29, Stephen Grossberg.

"Adaptive Junction: A Spatio-Temporal Neuron Model", Proceedings, International Joint Conference on Neural Networks, Washington, D.C., Jan. 1990, vol. 1, pp. I-353-I-356, Yoshiaki Ajioka, et al.

FIG.5A
FIG.5B
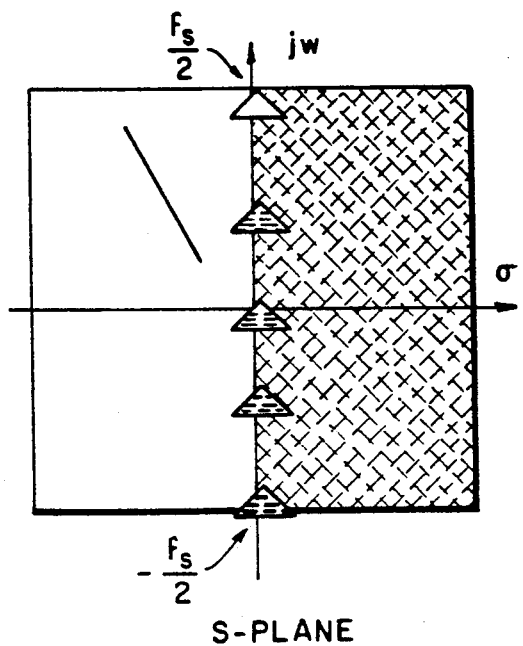
S-PLANE
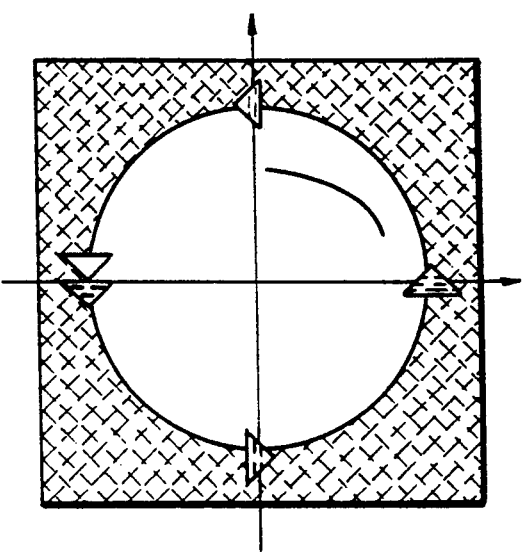
Z-PLANE
FIG.6A
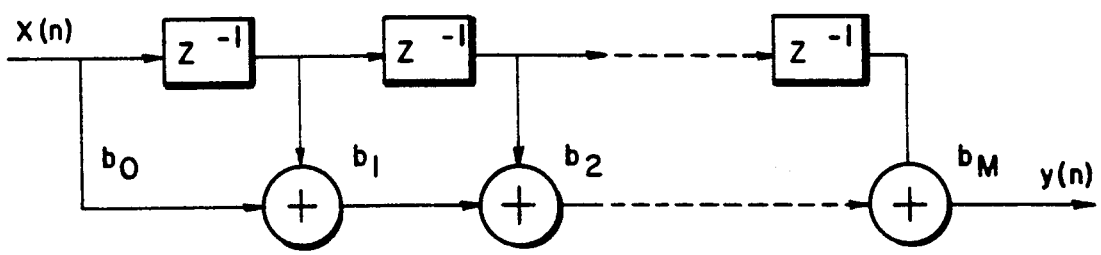

NEURAL NETWORK FOR PROCESSING BOTH SPATIAL AND TEMPORAL DATA WITH TIME BASED BACK-PROPAGATION

ORIGIN OF THE INVENTION

The invention described herein was made by employees of the United States Government and ma be manufactured and used by or for the Government of the United States of America for governmental purposes without payment of any royalties thereon or therefor.

BACKGROUND OF THE INVENTION

The present invention relates to a neural network for processing both spacial and temporal data (hereinafter "space-time neural network") and to an artificial neuron, or so-called "processing element", for use in such a space-time neural network.

More particularly, the invention relates to a space-time neural network, and a processing element therefor, which receives a temporal sequence of inputs $X(n)$, $X(n-1)$, $X(n-2) \ldots$, where each input $X(n)$ is comprised of N components $x_1(n), x_2(n), \ldots x_j(n), \ldots x_N(n)$, and which maps such input representations into a single, plural-component output representation. The network may be a single layer network or it may comprise multiple layers of processing elements.

HISTORICAL PERSPECTIVE

Throughout history, the meaning of time has plagued the minds of mankind. The wise Greek philosophers, Socrates, Plato and Aristotle, pondered deeply about the influence of time had on human knowledge. The English poet, Ben Johnson, wrote "O for an engine to keep back all clocks", giving voice to our ageless lament over the brevity of human life. The great scientist Einstein, who developed the theory of relativity, believed that space and time cannot be considered separately, but that they depend upon one another.

There is an urgent need for systems which will reliably capture space-time knowledge. Human cognitive thought processes involve the use of both space and time. A childhood event is remembered by an occurrence (or space) and its associated place in time. We speak of an event which occurred a specific time ago. Linguistic meanings are expressed in a manner in which proper temporal order plays a crucial role in the conveyance of a concept. Take, for example, the phrases "house cat" and "cat house". Speech production, too, is very order dependent—subtleties in intonations may change the whole meaning of a concept. The more advanced engineering systems have characteristics which vary over time. For instance, complex machines such as the Space Shuttle Main Engine abound with sensors, each having characteristics which vary over the life of the machine's operation. A system which is capable of automatically associating spatial information with its appropriate position in time becomes increasingly significant in our age of automation.

Also, microscopic level investigations reveal a need to incorporate time or sequence discovery and adaptation into the neuron modelling framework. It is clearly evident that information exchange at the neuronal level occurs through a rich interchange of complex signals. Extensive research has been done on the olfactory bulb at anatomical, physiological, and behavioral levels. See W. J. Freeman, "Why Neural Networks Don't Yet Fly: Inquiry into the Neurodynamics of Biological Intelligence" *IEEE International Conference on Neural Networks,* San Diego, Calif., 1988, and B. Baird, *Nonlinear Dynamics of Pattern Formation and Pattern Recognition in the Rabbit Olfactory Bulb,* Elsevier Science Publishers B. V., North-Holland Physics Publishing Division, 0167-2789, 1986. These research findings have shown that information in biological networks takes the form of space-time neural activity patterns. The dynamic space-time patterns encode past experience, attempt to predict future actions, and are unique to each biological network.

The Neuron

As seen in FIG. 1, the "classical" biological neuron has several dendrites which receive information from other neurons. The soma or cell body performs a wide range of functions; it processes information from the dendrites in a manner which is not entirely understood and also maintains the cell's health. The information processed by the neuron is distributed by its axon to other interconnected neurons by the propagation of a spike or action potential. Along each dendrite are thousands of protrusions where neurons exchange information through a region known as the "synapse". The synaptic cleft releases chemicals called "neurotransmitters". Even at this microscopic level, the relevance for time-adaptive neural networks becomes clearly evident. Synaptic clefts take on various modifying roles such as neurotransmitter modulators, generators, and filters which cloud the neuron's inner workings and render these ever-changing dynamical properties especially difficult to study.

Connectionist architectures have impressively demonstrated several models of capturing temporal and spatial knowledge. To accomplish this, the most popular solution has been to distribute a temporal sequence by forcing it into a spatial representation. This method has worked well in some instances. See, e.g., J. A. Villarreal and P. Baffes, "Sunspot Prediction Using Neural Networks", SOAR '89—*Third Annual Workshop on Automation and Robotics,* 1987. But there are insurmountable problems with this approach and it has ultimately proven inadequate as a general technique.

Review of Neural Networks

A neural network is comprised of numerous, independent, highly interconnected artificial neurons, hereinafter called "processing elements", which simulate the functions of biological neurons. For so-called "back-propagation networks", each element can be characterized as having some input connections from other processing elements and some output connections to other elements. The basic operation of a processing element is to compute its activation value based upon its inputs and to send that value to its output. FIG. 2 is a schematic diagram of such a processing element. Note that this element has j input connections coming from j input processing elements. Each connection has an associated value called a "weight". The output of this processing element is a non-linear transform of its summed, continuous-valued inputs by the so-called "sigmoid transformation", as discussed in D. E. Rumelhart et al. "Learning Internal Representations by Error Propagation", in D. E. Rumelhart & J. L. McClelland (Eds.), *Parallel Distributed Processing: Explorations in the Microstructure of Cognition* (Vol. 1) (pp. 318-362) MIT Press, 1986, Cambridge, Mass.

When groups of such processing elements are arranged in sequential layers, each layer interconnected with the subsequent layer, the result is a wave of activations propagated from the input processing elements, which have no incoming connections, to the output processing elements. The layers of elements between the inputs and outputs take on intermediate values which perform a mapping from the input representation to the output representation. It is from these intermediate or "hidden" elements that the back-propagation network draws its generalization capability. By forming transformations through such intermediate layers, a backpropagation network can arbitrarily categorize the features of its inputs.

$$E_i = \Sigma w_{ij} p_j \quad (1)$$

$$p_i = P(E_i) = \frac{1}{1 + e^{-E_i}} \quad (2)$$

The Weights Of A Back-propagation Network

The heart of the back-propagation algorithm lies in how the values of its interconnections, or weights, are updated. Initially, the weights in the network are set to some small random number to represent no association between processing elements. Upon being given a set of patterns representing pairs of input/output associations, the network enters what is called a "training phase". During training, the weights are adjusted according to a learning algorithm, such as that described by Rumelhart et al. The training phase is modelled after a behavioristic approach which operates through reinforcement by negative feedback. That is, the network is given an input from some input/output pattern for which it generates an output by propagation. Any discrepancies found when comparing the network's output to the desired output constitute mistakes which are then used to alter the network characteristics. According to the Rumelhart et al. technique, every weight in the network is adjusted to minimize the total mean square errors between the response of the network, $P_{pi}$, and the desired outputs, $t_{pi}$, to a given input pattern. First, the error signal, $\delta_i$, is determined for the output layer, N:

$$\delta_i^{(N)} = (t_i - p_i^{(N)}) P'(E_i^{(N)}) \quad (3)$$

The indices p and i represent the pattern number and the index to a node respectively. The weights are adjusted according to:

$$\Delta w_{ij}^{(n+1)} = \alpha \Delta w_{ij}^{(n)} + \eta \delta_i^{(n+1)} P_j^{(n)} \quad (4)$$

where $\Delta w_{ij}^{(n)}$ is the error gradient of the weight from the j-th processing element in layer n to the i-th unit in the subsequent layer (n+1). The parameter $\alpha$ performs a damping effect through the multi-dimensional error space by relying on the most recent weight adjustment to determine the present adjustment. The overall effect of this weight adjustment is to perform a gradient descent in the error space; however, note that true gradient descent implies infinitesimally small increments. Since such increments would be impractical, is used to accelerate the learning process. In general, then, the errors are recursively back propagated through the higher layers according to:

$$\delta_i^{(n)} = \sum_j \delta_j^{(n+1)} w_{ji}^{(n)} P'(E_i^{(n)}) \quad (5)$$

where P'(E) is the first derivative of P(E).

Other Spatiotemporal Neural Network Architectures

A number of significant advances in capturing spatial-temporal knowledge with neural network systems have been made to date. See, e.g., M. I. Jordan "Serial Order: A Parallel Distributed Processing Approach", *ICS Report* 8604, Institute for Cognitive Science, University of California, San Diego, Calif., 1986, and J. L. Elman "Finding Structure in Time", *CRL Technical Report* 8801, Center for Research in Language, University of California, San Diego, Calif., 1988. Jordan approaches this problem by partitioning the input layer in a connectionist network into separate plan and state layers. In essence, Jordan's architecture acts as a back-propagation network, except for the specialized processing elements in the state layer, which receive their inputs from the output units, as well as from recurrent connections which allow the state layer elements to "remember" the network's most recent state. In other words, the state units behave as "pseudo inputs" to the network providing a past-state history. Here, a recurrent connection is one in which it is possible to follow a path from a processing element back onto itself as shown in FIG. 3. Recurrent networks of this type allow the element's next state to be not only dependent on external inputs, but also upon the state of the network at its most previous time step. In general, however, this network is trained to reproduce a predetermined set of sequence patterns from a static input pattern.

As an example, this network architecture has been used by J. A. Villareal, one of the named inventors herein, in developing a speech synthesizer. The inputs to the speech synthesis network represented a tri-phoneme combination and the output was partitioned to represent the various vocal tract components necessary to produce speech. Thus, the output layer in the speech synthesis neural network consisted of the coefficients to a time-varying digital filter, a gain element, and a pitch element which excited the filter, and a set of down-counting elements where each count represented a 100 millisecond speech segment. To train a single tri-phone set, the network was first reset by forcing the activation value of the processing elements in the state layer to zero. A tri-phone pattern was then presented to the network's input and held there during the learning process while the outputs changed to produce the appropriate output characteristics for that particular tri-phone combination. The outputs would represent the transition from one phoneme to another while a smooth transition in pitch, gain, and vocal tract characteristics would take place. The process was then repeated for other tri-phone combinations.

As shown in FIG. 4, Elman has modified Jordan's approach by constructing a separate layer, called the "context layer", which is equal in size to the number of units in the hidden layer. In this network the context units receive their inputs along a one-to-one connection from the hidden units, instead of from the output units as described by Jordan. The network works as follows: Suppose there is a sequential pattern to be processed. Initially, the activation values in the context units are reset to a value midway between the upper and lower bounds of a processing element's activation value, indicating ambiguous or "don't care" states. A pattern is presented to the network's input, forward propagating the pattern toward the output. At this point, the hidden layer activation levels are transferred one-for-one to elements in the context layer. If desired, error back-propagation learning can now take place by adjusting the weights between output and hidden, hidden and input, and hidden and context layers. The recurrent connections from the hidden to context layers are not allowed to change. At the next time step, the network's previous state is encoded by the activation levels in the context units. Thus, the context layer provides the network with a continuous memory.

SUMMARY OF THE INVENTION

A principal object of the present invention is to provide a processing element for a space-time neural network which is capable of processing temporal as well as spacial data.

A further principal object of the invention is to provide a space-time neural network comprised of a plurality of the aforementioned processing elements, which is capable of processing temporal as well as spacial data.

These objects, as well as other objects which will become apparent from the discussion that follows, are achieved, according to the present invention, by replacing the synaptic weights between two processing elements of the type shown in FIG. 2 with an adaptable-digital filter. Instead of a single synaptic weight (which with the standard back-propagation neural network represents the association between two individual processing elements), the invention provides a plurality of weights representing not only association, but also temporal dependencies. In this case, the synaptic weights are the coefficients to adaptable digital filters.

The biological implication of this representation can be understood by considering that synapses undergo a refractory period—responding less readily to stimulation after a response.

More particularly, the present invention is realized by providing a processing element (i) for use in a space-time neural network for processing both spacial and temporal data, the processing element being adapted to receive a sequence of inputs $X(n)$, $X(n-1)$, $X(n-2)$ ..., each input $X(n)$ being comprised of K components $x_1(n)$, $x_2(n)$, ... $x_j(n)$, ... $x_K(n)$. $x_K(n)$. The processing element comprises the combination of:

(a) a plurality K of adaptable filters ($F_{1i}$, $F_{2i}$, ... $F_{ji}$, ... $F_{Ki}$) each filter $F_{ji}$ having an input for receiving a respective component $x_j(n)$, $x_j(n-1)$, $x_j(n-2)$, ..., of the sequence of inputs, where $x_j(n)$ is the most current input component, and providing a filter output $y_j(n)$ in response to the input $x_j(n)$ which is given by:

$$y_j(n) = f(a_{mj} y_j(n-m), b_{kj} x_j(n-k)),$$

where $a_{mj}$ and $b_{kj}$ are coefficients of the filter $F_{ji}$ and f denotes the operation of the filter; and (b) a junction, coupled to each of the adaptive filters, providing a non-linear output $p_i(S_i(n))$ in response to the filter outputs $y_j(n)$ which is given by:

$$p_i(S_i(n)) = f(y_j(n)).$$

In this case the junction presents a sequence of output signals, $p_i(S_i(n))$, $p_i(S_i(n-1))$, $p_i(S_i(n-2))$, ....

At the network level, the invention is realized by providing a neural network for processing both spacial and temporal data, the network being adapted to receive a sequence of inputs $X(n)$, $X(n-1)$, $X(n-2)$..., each input $X(n)$ being comprised of N components $x_1(n)$, $x_2(n)$, ... $x_j(n)$, ... $x_H(n)$. The network comprises the combination of:

(a) a plurality L of first processing elements, each first processing element (i) comprising a plurality N of adaptable filters ($F_{1i}$, $F_{2i}$, ... $F_{ji}$, ... $F_{Hi}$), each filter $F_{ji}$ having an input for receiving a respective component $x_j(n)$, $x_j(n-1)$, $x_j(n-2)$, ..., of the sequence of inputs, where $x_j(n)$ is the most current input component, and providing a filter output $y_j(n)$ in response to an input $x_j(n)$ which is given by:

$$y_j(n) = f(a_{mj} y_j(n-m), b_{kj} x_j(n-k)),$$

where $a_{mj}$ and $b_{kj}$ are coefficients of the filter $F_{ji}$ and f denotes the action of the filter.

Each first processing element (i) further comprises a first junction, coupled to each of the adaptive filters, providing a non-linear output $p_i(S_i(n))$ in response to the filter outputs $y_j(n)$ which is given by:

$$p_i(S_i(n)) = f(y_j(n)).$$

In this case each first junction presents a sequence of first output signals, $$p_i(S_i(n)), p_i(S_i(n-1)), p_i(S_i(n-2)), \ldots$$

The preferred embodiments of the present invention will now be described with reference to the accompanying drawings.

BRIEF DESCRIPTION OF THE DRAWINGS

FIG. 5a and FIG. 5b are representational diagrams of an S-plane and a Z-plane, respectively, illustrating the relationship between the continuous domain S-plane and the discrete domain Z-plane.

FIG. 6a is a block diagram of a digital network for a finite impulse response (FIR) filter.

DESCRIPTION OF THE PREFERRED EMBODIMENTS

Digital Filter Theory Review

Figure 1:
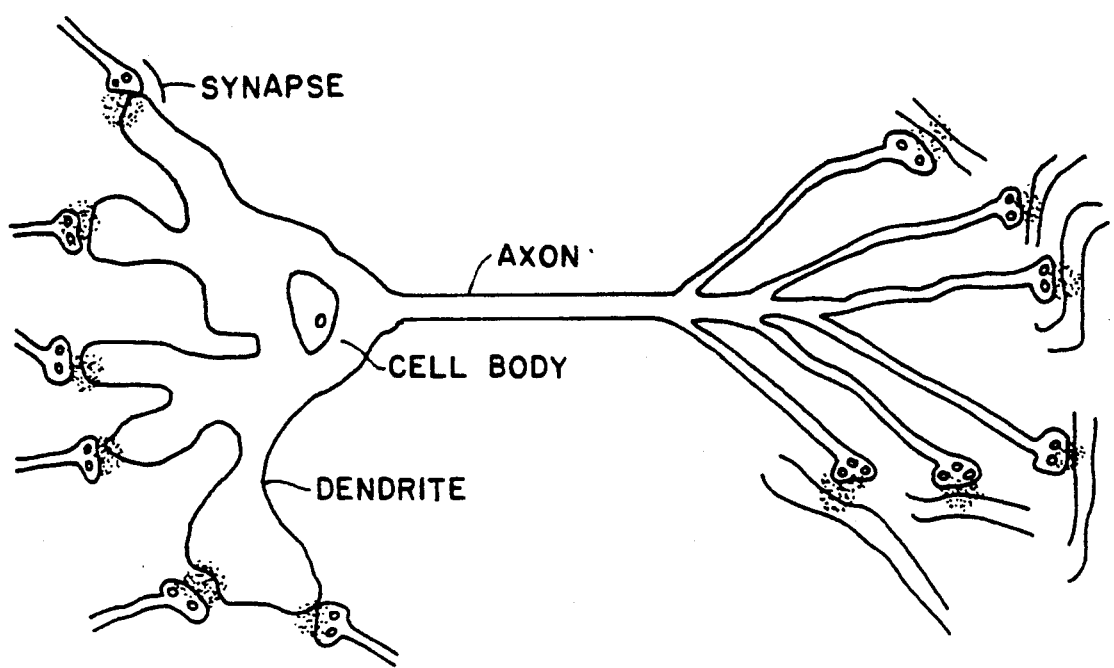
FIG. 1 is a representational diagram of a classical biological neuron.
Figure 2:
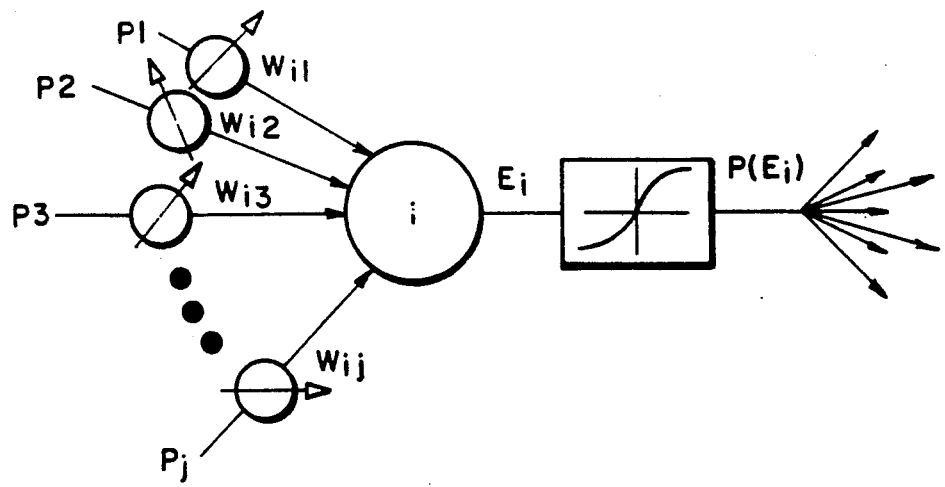
FIG. 2 is a block diagram of an artificial neuron or "processing element" in a back-propagation network.
Figure 3:
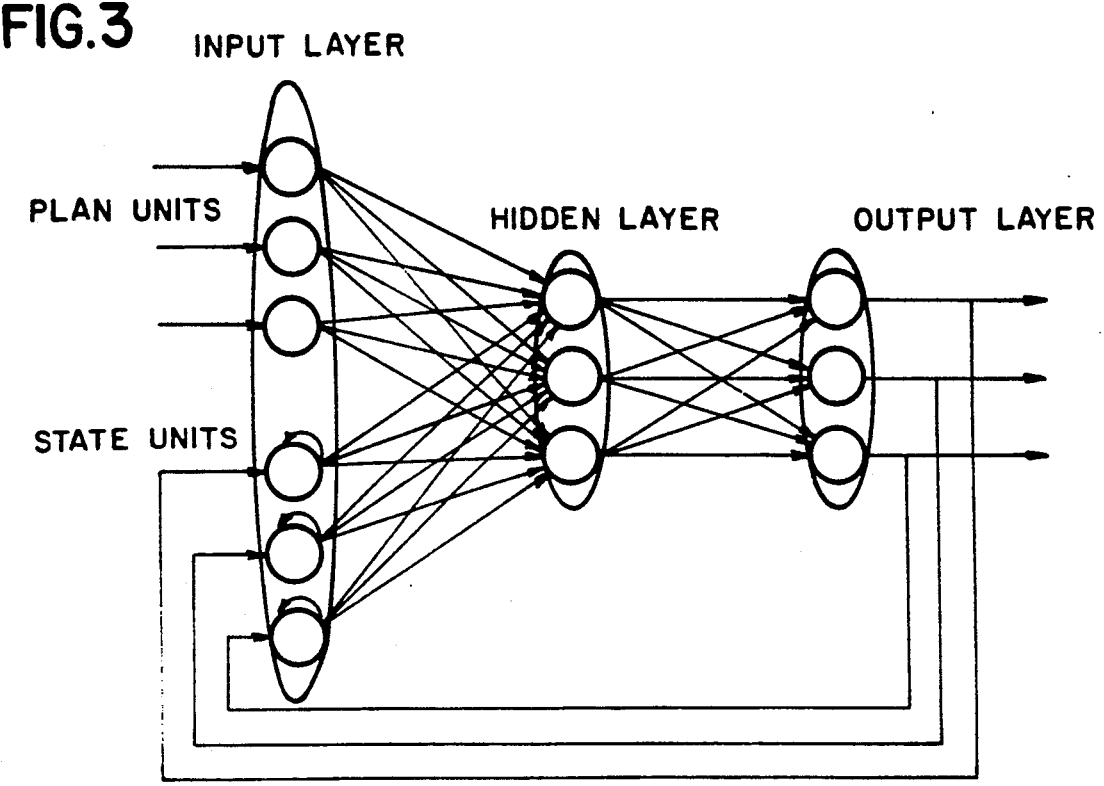
FIG. 3 is a block diagram showing the connection scheme for Jordan's network architecture which learns to associate a static input with an output sequence.
Figure 4:
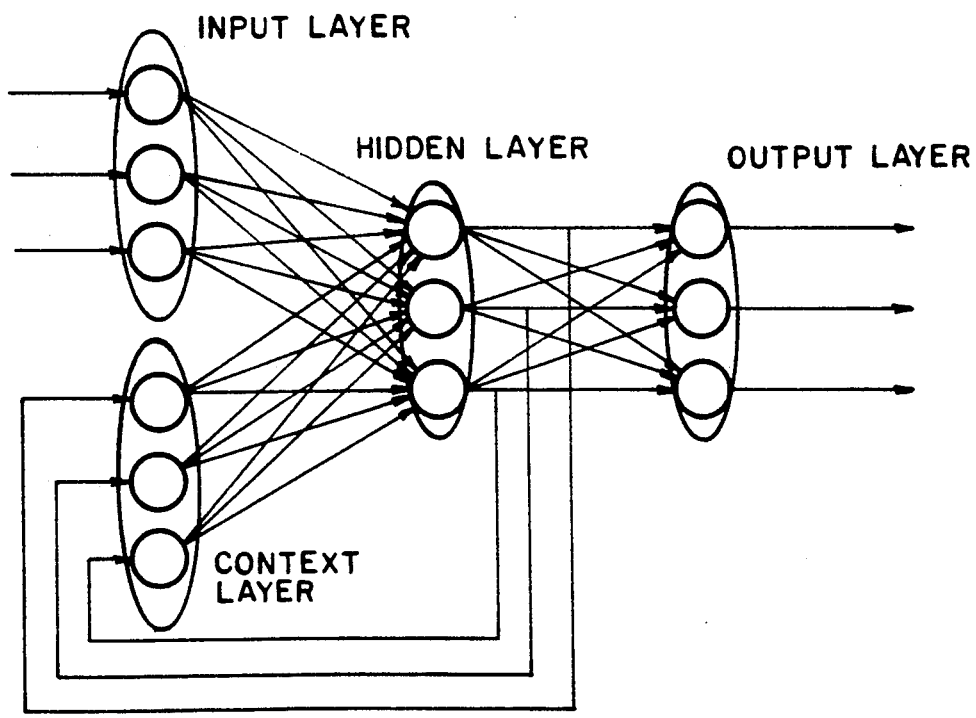
FIG. 4 is a block diagram showing the connection scheme for the Elman network wherein a history of the network's most previous state is stored by transferring the activations in the hidden layer to a pseudo input, context layer. Longer term memories are attainable by adding recurrent connections to the context units.

Before proceeding with a detailed description of the Space-Time Neural Network ("STNN") system according to the present invention, it is important to introduce digital filter theory and some nomenclature.

Linear difference equations are the basis for the theory of digital filters. The general difference equation can be expressed as:

$$y(n) = \sum_{k=0}^{N} b_k x(n-k) + \sum_{m=1}^{M} a_m y(n-m) \qquad (6)$$

where the x and y sequences are the input and output of the filter and $a_m$'s and $b_k$'s are the coefficients of the filter. Sometimes referred to as an s-transform, the well known continuous domain Laplace transform is an extremely powerful tool in control system design because of its capability to model any combination of direct current (DC) or static levels, exponential, or sinusoidal signals and to express those functions algebraically. The s-plane is divided into a damping component ($\sigma$) and a harmonic component ($j\omega$) and can mathematically be expressed as $$s = e^{-(\sigma + j\omega)} \qquad (7)$$

This formulation has a number of interesting characteristics as follows:

(1) The general Laplace transfer function can be thought of as a rubber sheet on the s-plane. A desirable transfer function is molded by strategetically placing a transfer function's roots of the numerator and the denominator in their appropriate positions. In this case, polynomial roots of the numerator are referred to as zeros and "pin" the rubber sheet to the s-plane's ground. On the other hand, polynomial roots of the denominator are referred to as poles and their locations push the rubber sheet upwards—much like the poles which hold up the tarpaulin in a circus tent. Therefore, zeros null out certain undesirable frequencies and poles can either generate harmonic frequencies (if close enough to the $j\omega$ axis) or allow certain frequencies to pass through the filter.

(2) Setting the damping coefficient, $\sigma$, to zero is effectively similar to taking a cross sectional cut along the $j\omega$ axis. This is the well known Fourier transform.

(3) A pole on the $j\omega$ axis, signifying no damping, produce a pure sinusoidal signal. However, a pole which travels onto the left half plane of the s-plane exponentially increases, eventually sending the system into an unstable state.

The discretized form of the Laplace transform has been developed further and is referred to as the z-transform. The notation $z^{-1}$ is used to denote a delay equal to one sampling period. In the s-domain, a delay of T seconds corresponds to $e^{-sT}$. Therefore, the two variables s and z are related by:

$$z^{-1} = e^{-sT} \qquad (8)$$

where T is the sampling period. The mapping between the variables can be further illustrated by referring to FIG. 5. First notice that the left half plane of the s-plane maps to the area inside a unit circle on the z-plane. In abiding with the Nyquist criterion, sampling at least twice the signal bandwidth, $f_s$, note that as one traverses from $-f_s/2$ to $+f_s/2$ on the s-plane, it is equivalent to going from $\pi$ radians toward 0 radians and back to $\pi$ radians in a counterclockwise direction on the z-plane. Furthermore, note that lines in the s-plane map to spirals in the z-plane.

By evaluating the z-transform on both sides of the linear difference equation, it can be shown that $$F(z) = \frac{Y(z)}{X(z)} = \frac{\sum_{k=0}^{N} b_k z^{-k}}{1 - \sum_{m=1}^{M} a_m z^{-m}} \qquad (9)$$

Figure 6B:
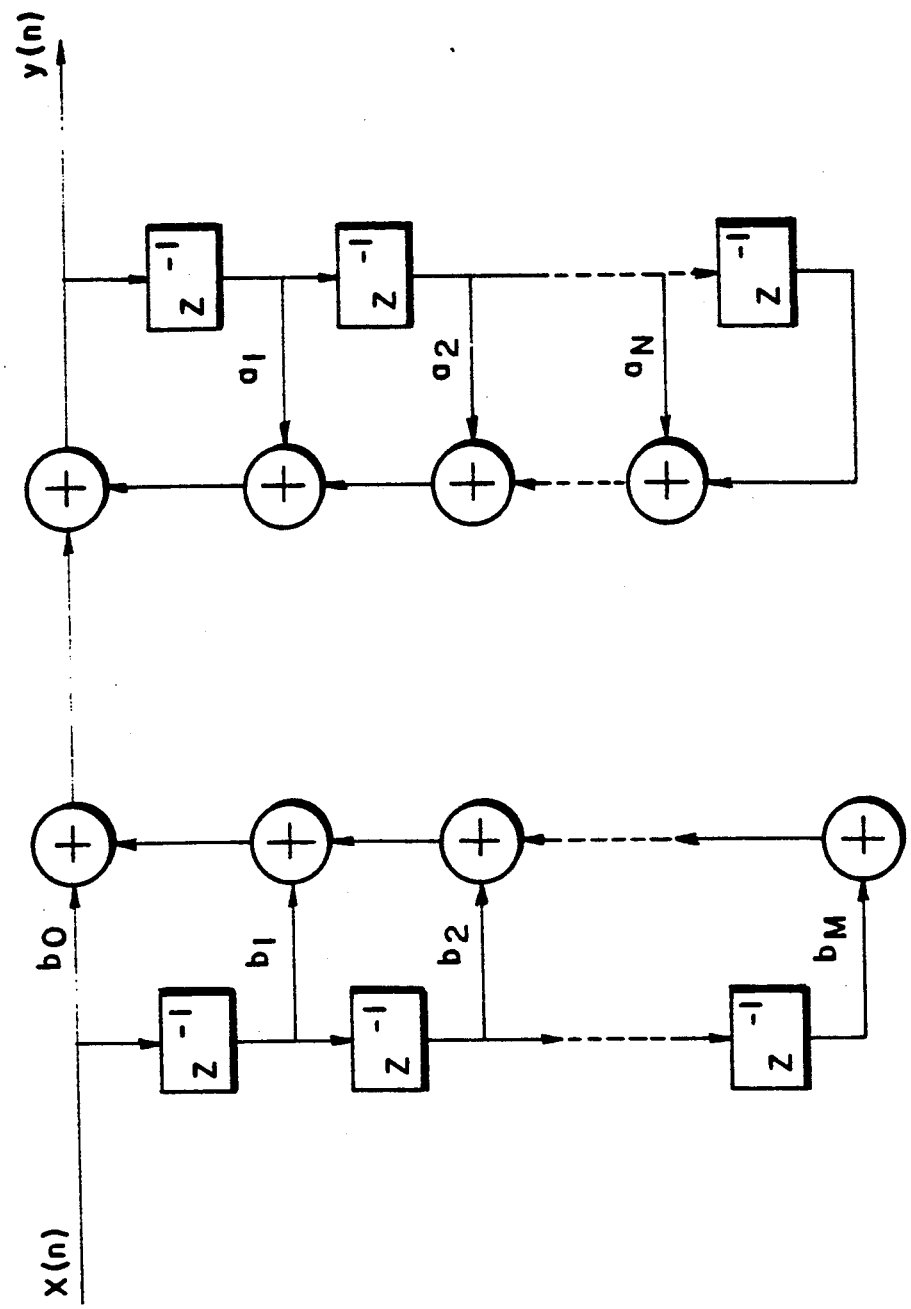
FIG. 6b is a block diagram of a digital network for an infinite impulse response (IIR) filter.

Digital filters are classified into recursive and non-recursive types. Filters of the nonrecursive type have no feedback or recurrent paths and as such all the $a_m$ terms are zero. Furthermore, digital filters are also classified in terms of their impulse responses. Because nonrecursive filters produce a finite number of responses from a single impulse, such filters are referred to as "Finite Impulse Response" ("FIR") filters. On the other hand, the recursive filters produce an infinite number of responses from an impulse and are therefore referred to as "Infinite Impulse Response" ("IIR") filters. For example, if a unit impulse is clocked through the filter shown in FIG. 6(a), the sequence $$b_0, b_1, b_2, \ldots b_H, 0, 0, 0, 0, 0, \ldots 0, 0, 0$$

will be the output. Notice that the filter produces only the coefficients to the filter followed by zeroes. However, if a unit impulse is presented to the filter shown in FIG. 6(b), because of the recursive structure, the response is infinite in duration.

FIR and IIR filters each possess unique characteristics which make one more desirable than the other depending upon the application. The most notable of these characteristics include:

(1) FIR filters, because of their finite duration are not realizable in the analog domain. IIR filters, on the other hand, have directly corresponding components in the analog world such as resistors, capacitors, and inductive circuits.

(2) IIR filters cannot be designed to have exact linear phase, whereas FIR filters have this property.

(3) Because of their recursive elements, IIR filters are an order of magnitude more efficient in realizing sharp cutoff filters than FIR filters.

(4) Because of their nonrecursiveness, FIR filters are guaranteed to be stable. This property makes FIR filters much easier to design than IIR filters.

These different properties between FIR and IIR filters must be carefully weighed in selecting the appropriate filter for a particular application.

DESCRIPTION OF THE SPACE-TIME NEURAL NETWORK

Having introduced digital filter theory, it is now possible to proceed with the detailed description of the Space-Time Neural Network (STNN) system according to the present invention. What follows is a detailed procedure for constructing and training the STNN. As mentioned earlier, in the STNN system the weights in the standard back-propagation algorithm are replaced with adaptable digital filters. The procedure involves the presentation of a temporal ordered set of pairs of input and output vectors. A network must consist of at least two layers of adaptable digital filters buffered by summing junctions which accumulate the contributions from the subsequent layer.

Figure 7:
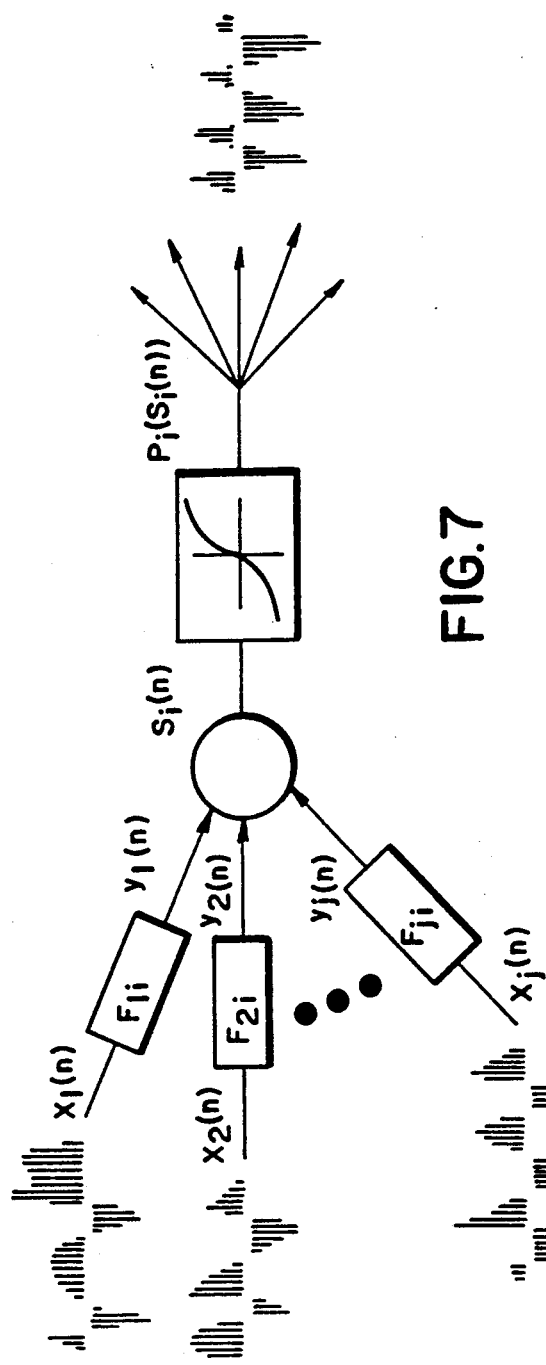
FIG. 7 is a block diagram of a space-time processing element according to the present invention.
Figure 8:
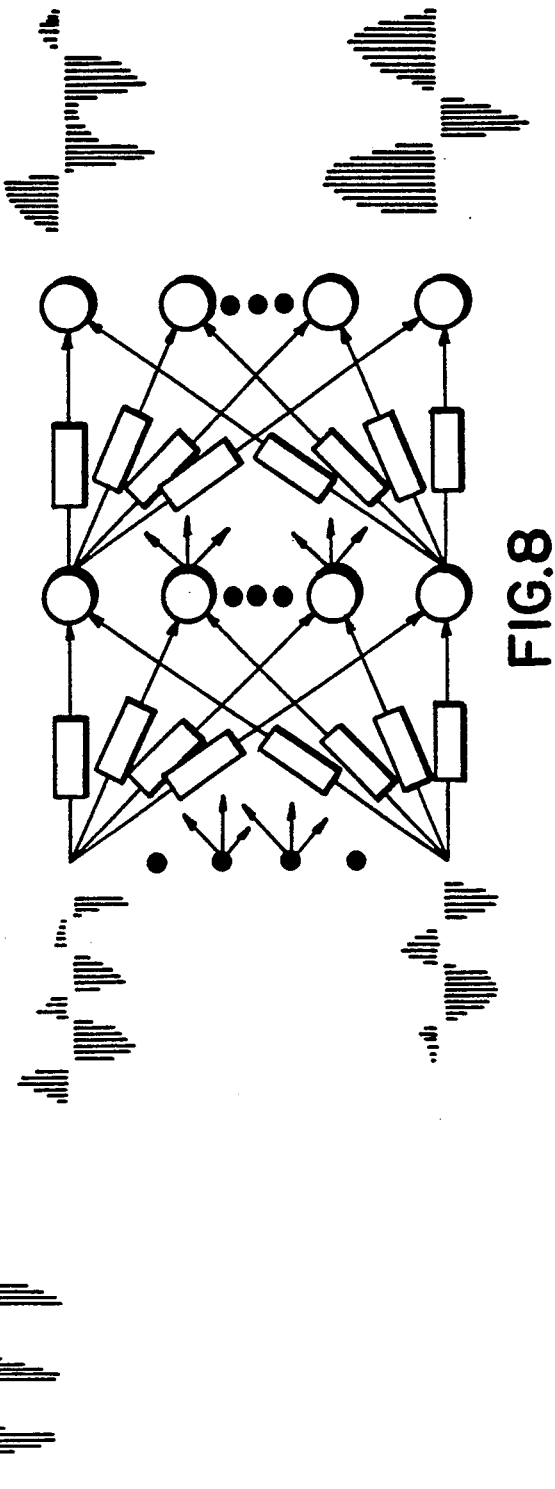
FIG. 8 is a block diagram of a fully connected network utilizing space time processing elements according to the present invention. In this network, a set of input waveform sequences are mapped into an entirely different output waveform sequence.

A pictorial representation of the space-time processing element is illustrated in FIG. 7. In this case, a value, say $x_j(n)$, is clocked in to its associated filter, say $F_{ji}(n)$, producing a response $y_j(n)$ according to the filter representation $$y_j(n) = \sum_{m=1}^{M} a_m y_j(n-m) + \sum_{k=0}^{N} b_k x_j(n-k) \quad (10)$$

All remaining inputs are also clocked in and accumulated by the summing junction i:

$$S_i(n) = \sum_{\text{all } j} y_j(n) \quad (11)$$

The contributions from the signals fanning in to the summing junction are then non-linearly transformed by the sigmoid transfer function $$p_i(S_i(n)) = \frac{1}{1 + e^{-S_i(n)}} \quad (12)$$

This output is then made available to all filter elements connected downstream.

As explained earlier, the space-time neural network is comprised of at least two layers of filter elements fully interconnected and buffered by sigmoid transfer nodes at the intermediate and output layers. A sigmoid transfer function is not used at the input. Forward propagation involves presenting a separate sequence-dependent vector to each input, propagating those signals throughout the intermediate layers as was described earlier until reaching the output processing elements. In adjusting the weighing structure to minimize the error for static networks, such as the standard back-propagation, the solution is straightforward. However, adjusting the weighing structure in a recurrent network is more complex because not only must present contributions be accounted for but contributions from past history must also be considered. Therefore, the problem is that of specifying the appropriate error signal at each time and thereby the appropriate weight adjustment of each coefficient governing past histories to influence the present set of responses.

The procedure for adjusting the weighing structure for the space time network is as follows:

First compute the errors at the output layer for each processing element, i, using the formula:

$$\delta_i = (D_i(k) - A_i(k))P'(E_i(k)) \quad (13)$$

where:
$D_i(k)$ is the kth desired response from a given sequence for neuron i at the output layer $A_i(k)$ is the network's output response at neuron i for the kth input sequence pattern $P'(E_i(k))$ is the first derivative of the sigmoid function for the ith output's activation value or $P(E_i(k))(1-P(E_i(k)))$ Next to compute the updates for the coefficients of each filter element between the hidden and output layer processing elements, a reversal procedure is implemented. Whereas in the forward propagation, input values were clocked into the filter elements, back-propagation instead involves the injection of errors into the filter elements according to the formula:

$$\Delta b_{ijk}(n+1) = \alpha[\eta\Delta[b_{ijk}(n)] + (1-\eta)\delta_i X_{ji}]$$

where:
$\Delta b_{ijk}(n+1)$ is the update for a zero coefficient, $b_k$, lying between processing elements i and j $\alpha$ is the learning rate $\Delta b_{ijk}(n)$ is the most recent update for the kth zero element between processing elements i and j $\eta$ damps most recent updates $\delta_i$ is described by (13)

$X_{ji}$ contain a history of the output of the jth neuron in the hidden layer

The recursive components in each filter element are treated the same way and are updated according to the formula:

$$\Delta a_{ijk}(n+1) = \alpha[\eta\Delta a_{ijk}(n) + (1-\eta)\delta_i Y_{ijk}] \quad (15)$$

where:
$\Delta a_{ijk}(n+1)$ is the update for a pole coefficient, $a_k$, lying between processing elements i and j $\alpha$ is the learning rate $\Delta a_{ijk}(n)$ is the most recent update for the kth zero element between processing elements i and j $\eta$ damps most recent updates $\delta_i$ is described by (13)

$Y_{ijk}$ contain a history of the activation values for the non-recursive filter elements between neurons i and j, k time steps ago For implementation purposes, the present algorithm only considers the accumulation of errors which span the length of the number of zeroes between the hidden and output processing elements. Thus:

$$\delta_{ik} = \sum_j P'(E_{ik})\delta_j b_{ijk} \quad (16)$$

where:
i is the index of the hidden neuron j ranges over the neuron idices for the output layer $\delta_j$ is described by (13)

P'($E_{ik}$) is the first derivative of the sigmoid function for the kth history of activation levels for the ith neuron in the hidden layer $\delta\!b_{ijk}$ sums the results of injecting the previously computed errors found in equation (13) through the FIR portion of the filter element, $b_{ijk}$, found between the ith neuron in the hidden layer and the jth neuron in the output layer.

Simulations

The space-time neural network according to the present invention was constructed and tested to perform a number of simulations. Source code for a computer program written in "C" language for simulation of the STNN is included in the Appendix below.

The first simulation test was a variation of the classic XOR problem. The XOR is of interest because it cannot be computed by a simple two-layer network. Ordinarily, the XOR problem is presented as a two bit input combination of (00, 01, 10, 11) producing the output (0, 1 1, 0).

This problem was converted into the temporal domain in the following way. The first bit in a sequence was XOR'd with the second bit to produce the second bit in an output sequence; the second bit was XOR'd with the third bit to produce the third bit in an output sequence, and so on, giving the following:

| Input  | 1 | 0 | 1 | 0 | 1 | 0 | 0 | 0 | 1 | 1 | ... |
|--------|---|---|---|---|---|---|---|---|---|---|-----|
| Output | 0 | 1 | 1 | 1 | 1 | 1 | 0 | 0 | 0 | 1 | ... |

Figure 9:
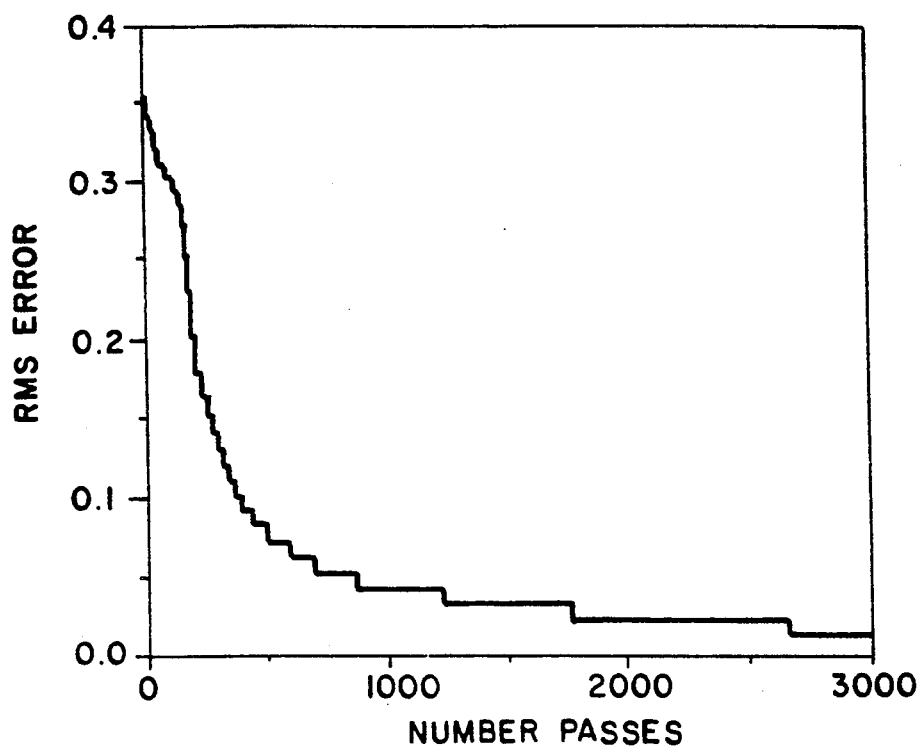
FIG. 9 is a graph of an error curve for the temporal XOR problem trained in a one input element, five hidden element and one output element network with 5 zeros and 0 poles between the input and hidden layers and 5 zeros and 0 poles between the hidden and output layers.

In the simulation, the training data consisted of 100 randomly generated inputs and the outputs were constructed in the manner described above. A network was implemented which had 1 input element, 5 hidden elements and 1 output element and had 5 zero coefficients and 0 pole coefficients between the input and hidden layers and 5 zero coefficients and 0 pole coefficients between the hidden and output layers. The task of the network was to determine the appropriate output based on the input stream. The error curve for the network showing the RMS error in dependence upon the number of training passes is shown in FIG. 9.

For a second simulation, a network was implemented with 2 input elements, 8 hidden elements and 8 output elements having 5 zeros and 0 poles between input and hidden, and 5 zeros and 0 poles between hidden and output layers. A problem, called the Time Dependent Associative Memory Test, was constructed which would test the network's ability to remember the number of events since the last trigger pattern was presented. The data consisted of 1000 input/output pairs where the input bits were randomly constructed and the output appropriately constructed. As an example, consider the first 7 sets of data in the following list. Note that a "1" bit sequentially gets added to the output for the input patterns 0 0, 1 0, 1 0, 0 0, 1 0, and 0 1 until the 1 1 pattern is presented which resets the output back to the 1 0 0 0 0 0 0 0 state.

| Input | | Output | | | | | | | |
|---|---|---|---|---|---|---|---|---|---|
| 0 | 0 | 1 | 1 | 0 | 0 | 0 | 0 | 0 | 0 |
| 1 | 0 | 1 | 1 | 1 | 0 | 0 | 0 | 0 | 0 |
| 1 | 0 | 1 | 1 | 1 | 1 | 0 | 0 | 0 | 0 |
| 0 | 0 | 1 | 1 | 1 | 1 | 0 | 0 | 0 | 0 |
| 1 | 0 | 1 | 1 | 1 | 1 | 1 | 0 | 0 | 0 |
| 0 | 1 | 1 | 1 | 1 | 1 | 1 | 1 | 1 | 0 |

-continued

| Input | | Output | | | | | | | |
|---|---|---|---|---|---|---|---|---|---|
| 1 | 1 | 1 | 0 | 0 | 0 | 0 | 0 | 0 | 0 |
| 1 | 0 | 1 | 1 | 0 | 0 | 0 | 0 | 0 | 0 |
| 1 | 0 | 1 | 1 | 1 | 0 | 0 | 0 | 0 | 0 |
| 1 | 1 | 1 | 0 | 0 | 0 | 0 | 0 | 0 | 0 |
| 1 | 0 | 1 | 1 | 0 | 0 | 0 | 0 | 0 | 0 |
| 0 | 1 | 1 | 1 | 1 | 0 | 0 | 0 | 0 | 0 |
| 1 | 1 | 1 | 0 | 0 | 0 | 0 | 0 | 0 | 0 |

Figure 10:
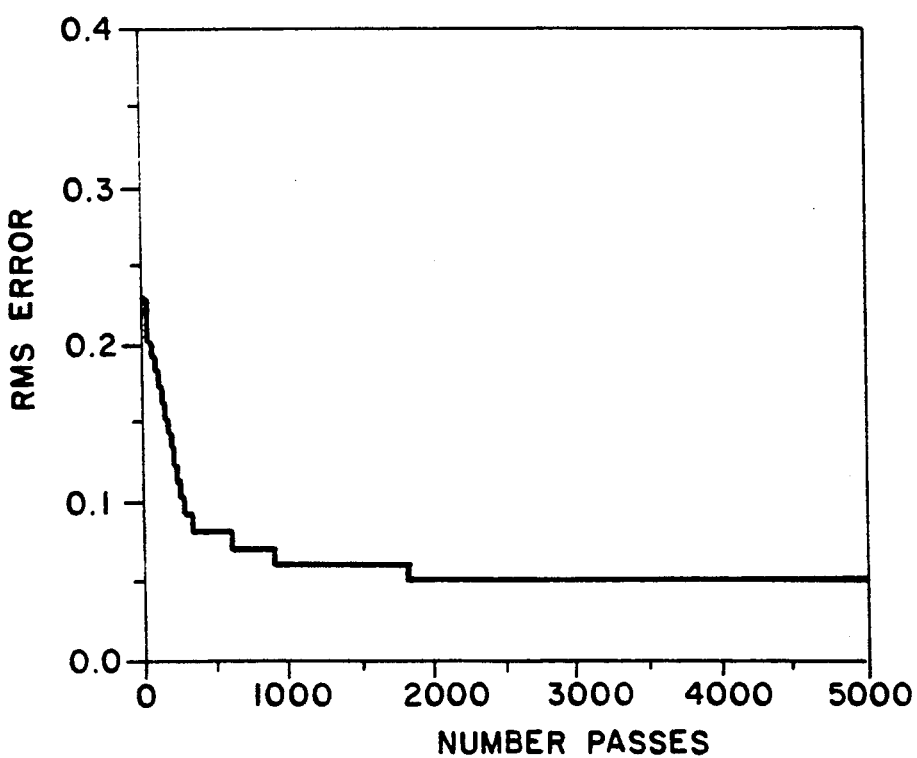
FIG. 10 is a graph of an error curve for a two input element, eight hidden element and eight output element network with 5 zeros and 0 poles between the input and hidden layers and 5 zeros and 0 poles between the hidden and output layers.

The error curve for this Time Dependent Associative Memory Test is shown in FIG. 10. As will be seen from FIGS. 9 and 10, the RMS error converged rapidly toward zero.

Figure 11:
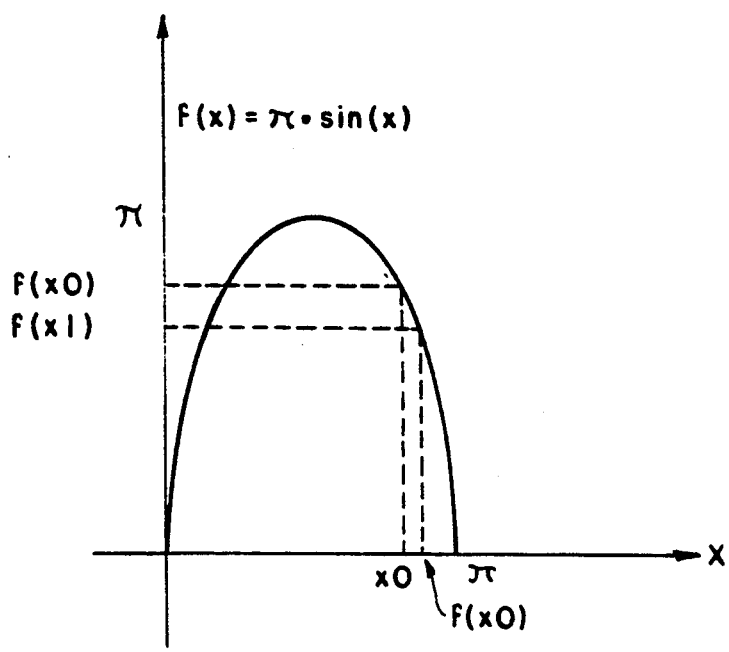
FIG. 11 is a diagram showing the generation of a chaotic sequence by computer.
Figure 12:
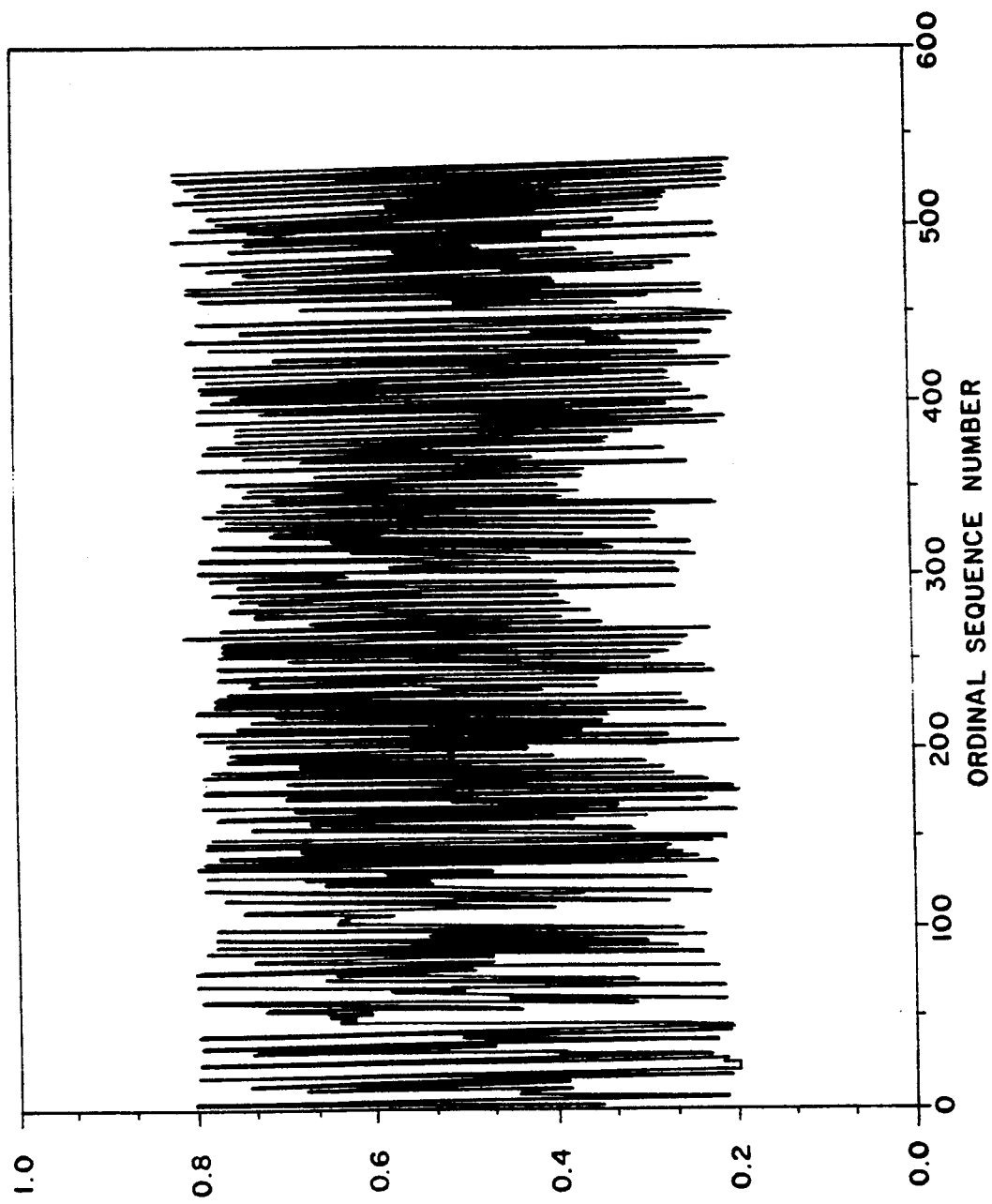
FIG. 12 is a plot of a chaotic sequence generated by a process described hereinbelow.

The final simulation illustrates that the space-time neural network according to the present invention is able to learn the dynamics and model the behavior of a chaotic system. The graph shown in FIG. 11 is a plot of a sine function extending from 0 to $\pi$ with amplitude $\pi$. A "chaotic sequence" can be generated by randomly selecting a value between 0 and $\pi$, say $x_0$, determining the value of $\pi \cdot \sin(x_0)$ to produce $x_1$, and repeating this iterative process into a general form represented by $X_{n+1} = \pi \cdot \sin(x_n)$. FIG. 12 shows a collection of x's generated by this process.

Figure 14:
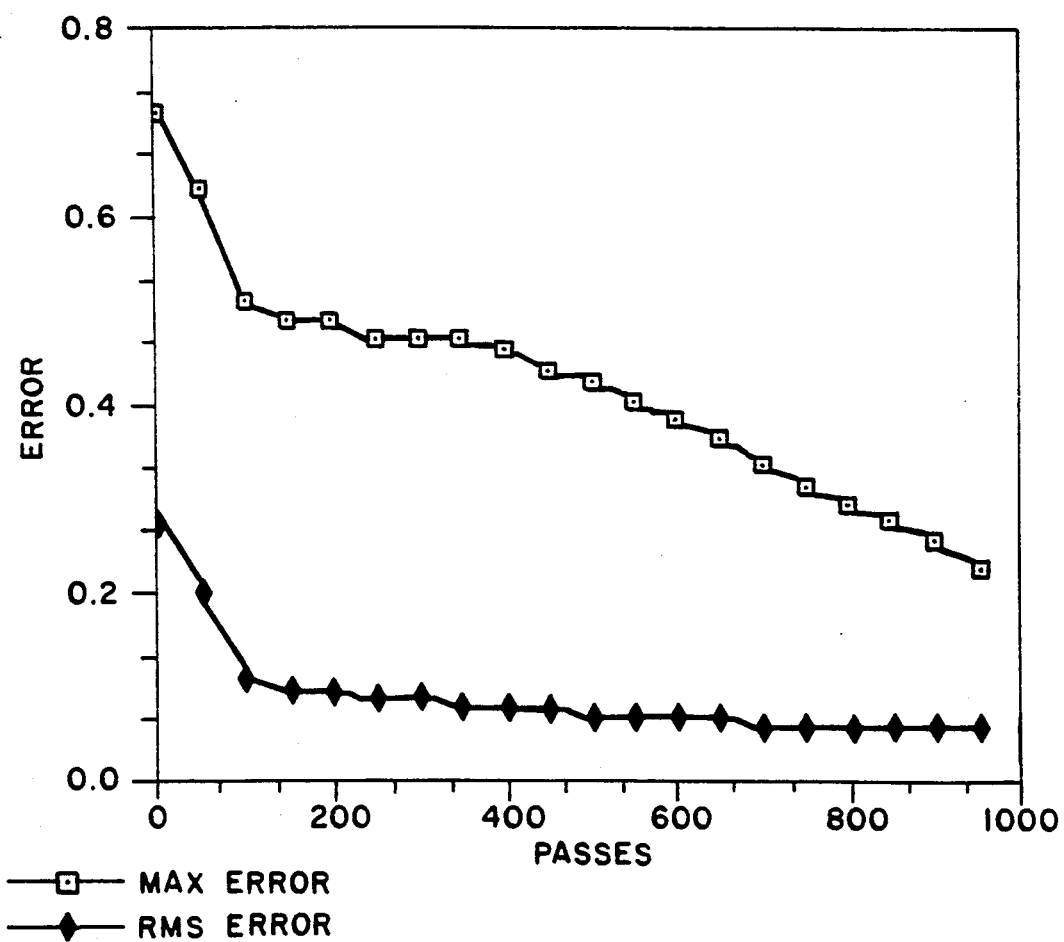
FIG. 14 is graph showing the testing performance (both maximum and RMS errors) as function of training passes.
Figure 13:
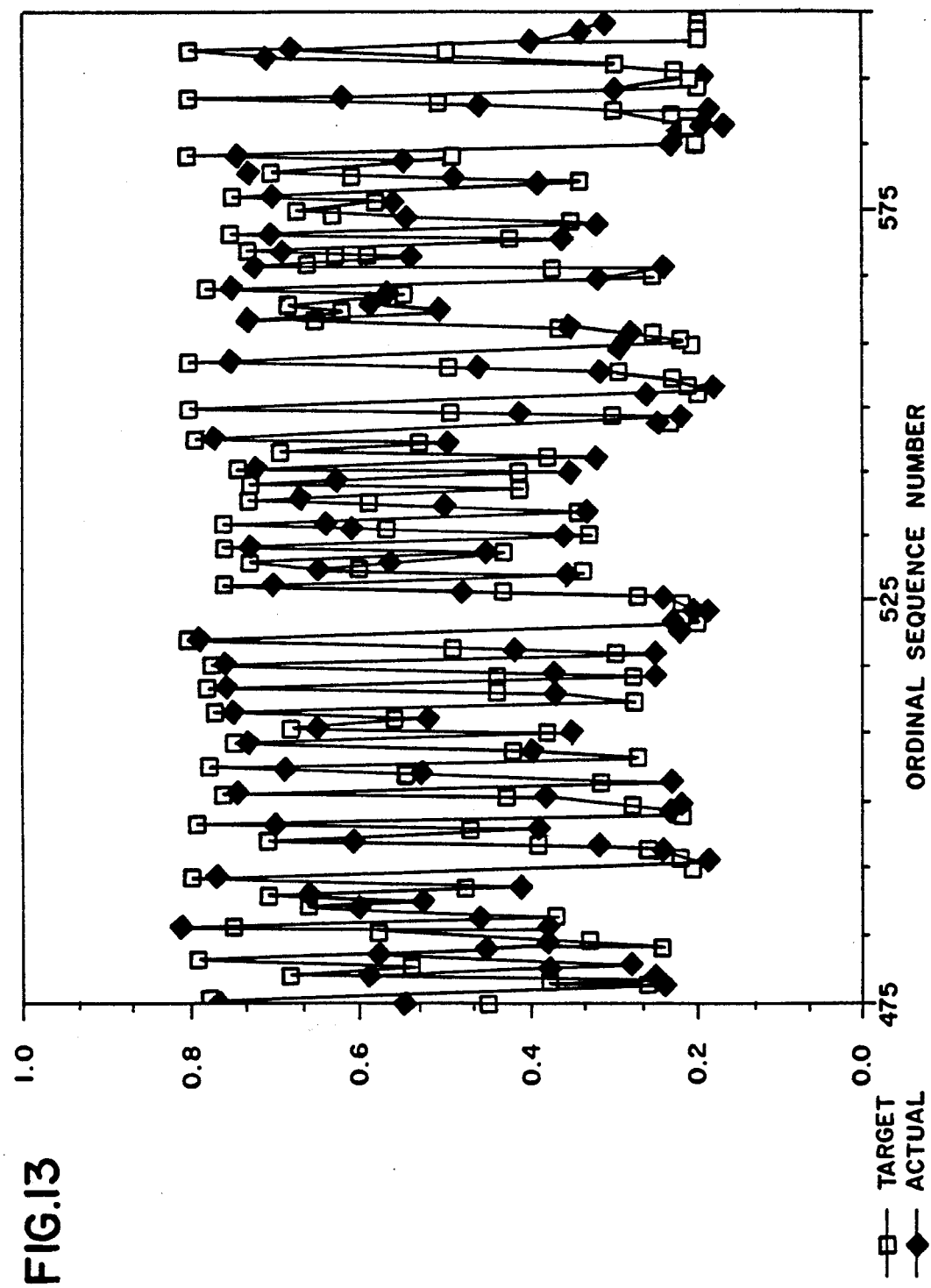
FIG. 13 is a diagram showing the space-time neural network's performance on a chaotic problem after 900 training passes. The ordinal numbers 525 through 625 represent the network's prediction.

The goal of the STNN system in this simulation was to predict a future point, given a history of past points. To keep within the linear bounds of the sigmoid, the sequences collected above were normalized such that the range from 0 to $\pi$ mapped into the range from 0.2 to 0.8. An STNN system was constructed with 1 input element, 6 hidden elements and 1 output element, with 10 zeros and 0 poles between the input and hidden layers, and 10 zeros and 0 poles between hidden and output layers. The system was trained with 525 data points. Training was periodically suspended to test the system by stimulating it with the sequence of the last 50 samples of the training set—the ordinal values 475 to 525. At this point, the system was prepared to make its first prediction. The predicted value could have been fed back into the input to generate a new predicted value. Instead, the system was fed with actual values generated by the chaos algorithm—that is, ordinal numbers 526 through 625. FIG. 13 illustrates the system's performance at various stages during the training process. FIG. 14 shows the average error of the network's performance during the training process.

| Output | 0.31 | 0.51 | 0.80 | 0.21 | 0.22 | 0.25 | 0.37 | ... | |
|--------|------|------|------|------|------|------|------|-----|---|
| Input  | 0.51 | 0.80 | 0.21 | 0.22 | 0.25 | 0.37 | 0.67 | 0.59 | ... |

Conclusion

The space time neural network (STNN) is a generalization of the back-error propagation network to the time domain. By adopting concepts from digital filtering theory, the network is afforded a distributed temporal memory which permits modeling complex dynamic systems and recognition of temporal sequences as shown in the simulations. The STNN architecture differs from previous work of Jordan and Elman in that the network's memory is distributed over the connections rather than being implemented as a special layer of nodes. This distinction allows the STNN to possess an adaptive temporal memory without introducing additional nonlinearities into the learning law; i.e., the action which occurs on connections between nodes is still linear, while the nonlinear actions occur within the nodes.

There has thus been shown and described a novel space-time neural network for processing both spacial and temporal data which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

U.S. Gov't

MSC-21874-1

Patent Application

APPENDIX

```
/* File: stnn_com.h-- portability and common declarations for the Space */
/* Time Neural Network code. */
/* by R. O. Shelton and J. A. Villarreal */
/* A product of the Software Technology Branch of NASA/JSC */
/* Any duplication or distribution of this code without the express consent */
/* of NASA is a violation of Federal Law. */ include <stdio.h>
include <string.h>
#include <math.h>
#define TBC 0
#define true '\01'
#define false '\0'
#define Stability_Threshold 1000.0
#define machine_zero 0.00001
#define min(a,b) (((a)<(b))? (a): (b))
#define square(x) ((x)*(x))
#define sigmoid(x) (1.0/(1.0+exp(-(x))))
#define d_sigmoid(y) ((y)*(1.0-(y)))
#if TBC
#include <alloc.h>
#define r_b 15
#define GIGANTIC huge
#else
#include <malloc.h>
#define r_b 15
#define GIGANTIC
#endif
#define getch() (gets(str1)[0])
#define frand(x,y) ((x)+((y)-(x))*((rand()&((1<<r_b)-1))/\
(float)(1<<r_b)))

typedef char string [256];

FILE *HidFile;

int n0 = 1, n1 = 6, n2 = 1, nz0 = 5,
np0 = 0, NumSamples, NumTestSamples, NumSets, NumTestSets, np1 = 0, nz1 = 5;
long total_cycles = 0;
float alpha = 0.2, delta = 0.9, epsilon;

float **iv0, ***ov0, ***ic0, ***oc0, ***dic0 ,***doc0, ***mic0, ***moc0,
***ih0, ****oh0,
**iv1, ***ov1, ***ic1, ***oc1, ***dic1, ***doc1, ***mic1, ***moc1,
*nv0, *nv1,
*OutError, *HidError, **WaveIn, **WaveOut, **TestWaveIn, **TestWaveOut;

string str1, str2;

#include <stdio.h>
include <strings.h> typedef char string[256];

extern string str1, str2;

extern int n0, n1, n2,
nz0, np0, nz1, np1;
extern float ***ic0, ***oc0,
***ic1, ***oc1;

/* get coefficients from file name s */
void get_coefficients (s)
char *s;
{
    int i, j;
    FILE *f;
```

```
        while ((f=fopen(s, "rb")) == NULL)
            {
            printf (" file is not found\n filename> ", s);
            gets(s);
            } /* end while */
        for (i = 0; i < n1; i++)
            for (j = 0; j < n0; j++)
                {
                if (nz0 > 0)
                fread ((char*)ic0[j][i],
                        (unsigned)sizeof(float), nz0, f);
                if (np0 > 0)
                fread ((char*)oc0[j][i],
                        (unsigned)sizeof(float), np0, f);
                } /* end for i j */
        for (i = 0; i < n2; i++)
            for (j = 0; j < n1; j++)
                {
                if (nz1 > 0)
                fread ((char*)ic1[j][i],
                        (unsigned)sizeof(float), nz1, f);
                if (np1 > 0)
                fread ((char*)oc1[j][i],
                        (unsigned)sizeof(float), np1, f);
                } /* end for i j */
        fclose (f);
        } /* end get_coefficients */

/* save coefficients in file name s */
void save_coefficients (s)
char *s;
    {
    int i, j, ret;
    FILE *f, *f1;

/*  if (fopen (s, "r") != NULL)
        {
printf (" file is exists\n new name or carriage return to overwrite> ", s);
        if (strlen(gets(str2)))
        strcpy (s, str2);
        fclose (f);
        } end if */
    f = fopen (s, "wb");
    for (i = 0; i < n1; i++)
        for (j = 0; j < n0; j++)
            {
            if (nz0 > 0)
            fwrite ((char*)ic0[j][i],
                    (unsigned)sizeof(float), nz0, f);
            if (np0 > 0)
            fwrite ((char*)oc0[j][i],
                    (unsigned)sizeof(float), np0, f);
            } /* end for i j */
    for (i = 0; i < n2; i++)
        for (j = 0; j < n1; j++)
            {
            if (nz1 > 0)
            fwrite ((char*)ic1[j][i],
                    (unsigned)sizeof(float), nz1, f);
            if (np1 > 0)
            fwrite ((char*)oc1[j][i],
                    (unsigned)sizeof(float), np1, f);
            } /* end for i j */
    fclose (f);
        } /* end save_coefficients */ include "stnn_com.h"
/* general memory allocation routine */ char *mem_alloc (n)
int n;
    {
    char *r;

if (n > 0)
        {
        r = (char*) malloc (n);
        if (r == NULL)
            {
            printf (" mem_alloc: We are out of memory!\n");
            exit (0);
            } /* end if */
        return r;
        } /* end if */
    else
```

```
                        return NULL;
        } /* end mem_alloc */

/* Declares a three dimensional array of size L X M X N. Returns the
        address to the three dimensional array */ float*** DeclareTripleArray (L, M, N)
        int L, M, N;
        {
                int i, j;
                float ***Triple;

Triple = (float***)mem_alloc(L * sizeof(float**));
                for (i = 0; i < L; i++)
                {
                        Triple[i] = (float**)mem_alloc(M * sizeof(float*));
                        for (j = 0; j < M; j++)
                                Triple[i][j] = (float*)mem_alloc(N * sizeof(float));
                } /* end i */
                return(Triple);
        } /* end DeclareTripleArray */

/*

/*
        Declares a two dimensional array of size L X M . Returns the
        address to the two dimensional array
        */ float** DeclareDoubleArray (L, M)
        int L, M;
        {
                int i;
                float **Double;
                Double = (float**)mem_alloc(L * sizeof(float*));
                for (i = 0; i < L; i++)
                        Double[i] = (float*)mem_alloc(M * sizeof(float));
                return(Double);
        } /* end DeclareDoubleArray */ void reset_network()
        {
                int i, j, k;

for (i = 0; i < n0; i++)
        {
                for (k = 0; k < nz0; k++)
                {
                        iv0[i][k] = 0.0;
                        for (j = 0; j < n1; j++)
                                dic0[i][j][k] = mic0[i][j][k] = 0.0;
                } /* end for k */
                for (j = 0; j < n1; j++)
                {
                        for (k = 0; k < np0; k++)
                                ov0[i][j][k] = doc0[i][j][k] = moc0[i][j][k] = 0.0;
                        ov0[i][j][np0] = 0.0;
                } /* end for j */
        } /* end for i */
        for (i = 0; i < n1; i++)
        {
                for (k = 0; k < nz1; k++)
                {
                        iv1[i][k] = 0.0;
                        for (j = 0; j < n2; j++)
                                dic1[i][j][k] = mic1[i][j][k] = 0.0;
                } /* end for k */
                for (j = 0; j < n2; j++)
                {
                        for (k = 0; k < np1; k++)
                                ov1[i][j][k] = doc1[i][j][k] = moc1[i][j][k] = 0.0;
                        ov1[i][j][np1] = 0.0;
                } /* end for j */
        } /* end for i */
        } /* end reset_network */ void allocate_network ()
{
        int i, j, k;
float wtlm0, wtlm1;

printf (" enter sizes of input hidden and output layers <%d %d %d> ",n0,n1,n2);
        sscanf (gets(str1),"%d%d%d",&n0,&n1,&n2);
        printf (" enter numbers of zeros and poles from input to hidden <%d %d>",
                nz0,np0);
```

```
        sscanf (gets(strl),"%d%d",&nz0,&np0);
        printf (" enter numbers of zeros and poles from hidden to output <%d %d> ",
            nz1, np1);
        sscanf(gets(strl),"%d%d",&nz1,&np1);
        /* increment nz's because must have at least 1 input coefficient */
        nz0++;
        nz1++;
        nv0 = (float*)mem_alloc(n1*sizeof(float));
        nv1 = (float*)mem_alloc(n2*sizeof(float));
        HidError = (float*)mem_alloc(n1*sizeof(float));
        OutError = (float*)mem_alloc(n2*sizeof(float));
        iv0 = DeclareDoubleArray(n0,nz0);
        iv1 = DeclareDoubleArray(n1,nz1);
        ov0 = DeclareTripleArray(n0,n1,np0+1);
        ic0 = DeclareTripleArray(n0,n1,nz0);
        dic0 = DeclareTripleArray(n0,n1,nz0);
        oc0 = DeclareTripleArray(n0,n1,np0);
        doc0 = DeclareTripleArray(n0,n1,np0);
        mic0 = DeclareTripleArray(n0,n1,nz0);
        moc0 = DeclareTripleArray(n0,n1,np0);
        ov1 = DeclareTripleArray(n1,n2,np1+1);
        ic1 = DeclareTripleArray(n1,n2,nz1);
        dic1 = DeclareTripleArray(n1,n2,nz1);
        oc1 = DeclareTripleArray(n1,n2,np1);
        doc1 = DeclareTripleArray(n1,n2,np1);
        mic1 = DeclareTripleArray(n1,n2,nz1);
        moc1 = DeclareTripleArray(n1,n2,np1);
        ih0 = (float***)mem_alloc(nz1*sizeof(float**));
        oh0 = (float****)mem_alloc(nz1*sizeof(float***));
        for (i = 0; i < nz1; i++)
        {
                ih0[i] = DeclareDoubleArray(n0, nz0);
                oh0[i] = DeclareTripleArray(n0, n1, np0+1);
        } /* end for i */
        printf (" seed> ");
        if (strlen(gets(strl)))
                srand(atoi(strl));
        else
                srand(clock());
wtlm0 = min (0.5, 2.0/sqrt((float)n0));
wtlm1 = min (0.5, 2.0/sqrt((float)n1));
        for (i = 0; i < n0; i++)
                for (j = 0; j < n1; j++)
                {
                        for (k = 1; k < nz0; k++)
                                ic0[i][j][k] = 0.0;
                        ic0[i][j][0] = frand (-wtlm0, wtlm0);
                        for (k = 0; k < np0; k++)
                                oc0[i][j][k] = 0.0;
                } /* end for j */
        for (i = 0; i < n1; i++)
                for (j = 0; j < n2; j++)
                {
                        for (k = 1; k < nz1; k++)
                                ic1[i][j][k] = 0.0;
                        ic1[i][j][0] = frand (-wtlm1, wtlm1);
                        for (k = 0; k < np1; k++)
                                oc1[i][j][k] = 0.0;
                } /* end for j */
} /* end allocate_network */

/* This routine gets the I/O training data. "WaveIn" and "WaveOut"
are two dimensional arrays. "WaveIn" has the dimensions
n0 X NumSamples and "WaveOut" has the dimensions
n2 X NumSamples. n0 and n2 should already be
declared on input.
*/
void get_io ()
{
        int i, NI, NO;
        float u1;
        FILE *f, *f1;

printf (" Network Generalization Test file name> ");
        while ((f1=fopen(strcat(gets(strl),".tst"),"r"))==NULL)
                printf (" .tst file %s not found\n file name> ", strl);
        if (fscanf(f1, "%d%d",&NumTestSamples, &NumTestSets) != 2)
        {
           printf (" no header line file found in Test File!\n");
           exit (0);
        }
        printf (" i/o file name> ");
        while ((f=fopen(strcat(gets(strl),".iop"),"r"))==NULL)
                printf (" .iop file %s not found\n file name> ", strl);
        if (fscanf(f, "%d%d%d%d", &NI,&NO,&NumSamples, &NumSets) != 4)
        {
                printf (" no header line in i/o file!\n");
```

```
                exit (0);
        } /* end if */
        if ((NI!=n0)||(NO!=n2))
        {
                printf (" i/o file does not match network specification!\n");
                exit (0);
        } /* end if */
        WaveIn = DeclareDoubleArray (n0, (NumSets * NumSamples));
        WaveOut = DeclareDoubleArray (n2, (NumSets * NumSamples));
        TestWaveIn = DeclareDoubleArray (n0, (NumTestSets * NumTestSamples));
        TestWaveOut = DeclareDoubleArray (n2, (NumTestSets * NumTestSamples));
        for (i = 0; i < (NumTestSets * NumTestSamples); i++)
        {
                for (NI = 0; NI < n0; NI++)
                {
                    if (fscanf(f1, "%f", &u1) == 0)
                        {
                                printf (" incomplete Test file!\n");
                                exit (0);
                        } /* end if */
                        TestWaveIn[NI] [i] = u1;
                } /* end NI */
                for (NO = 0; NO < n2; NO++)
                {
                        if (fscanf(f1, "%f", &u1) == 0)
                        {
                                printf (" incomplete Test file!\n");
                                exit (0);
                        } /* end if */
                        TestWaveOut[NO] [i] = u1;
                } /* end NO */
        } for (i = 0; i < (NumSamples * NumSets); i++)
        {
                for (NI = 0; NI < nC; NI++)
                {
                        if (fscanf(f, "%f", &u1) == 0)
                        {
                                printf (" incomplete i/o file!\n");
                                exit (0);
                        } /* end if */
                        WaveIn[NI] [i] = u1;
                } /* end NI */
                for (NO = 0; NO < n2; NO++)
                {
                        if (fscanf(f, "%f", &u1) == 0)
                        {
                                printf (" incomplete i/o file!\n");
                                exit (0);
                        } /* end if */
                        WaveOut[NO] [i] = u1;
                } /* end NO */
        } /* end for i */
        fclose (f);
} /* end get_io */ void print_err ()
{
        int i, *size;
        float *t;

printf (" hidden or output error <h/o> ");
        if (getch() == 'h')
        {
                size = &n1;
                t = HidError;
        } /* end if */
        else
        {
                size = &n2;
                t = OutError;
        } /* end else */
        for (i = 0; i < *size; i++)
        {
                printf (" %6.2f", t[i]);
                if ((i%6) == 5)
                        putchar ('\n');
        } /* end for i */
        if (!(i%6))
                putchar ('\n');
} /* end print_err */
```

```c
void print_correction ()
{
        int c = 0, i, j, k, *size_i, *size_j, *size_k;
        float ***t;

printf (" press return for help\n");
start:
        printf (" choice> ");
        switch (atoi(gets(str1)))
        {
        case (1):
                {
                        size_i = &n0;
                        size_j = &n1;
                        size_k = &nz0;
                        t = dic0;
                        break;
                } /* end 1 */
        case (2):
                {
                        size_i = &n0;
                        size_j = &n1;
                        size_k = &np0;
                        t = doc0;
                        break;
                } /* end 2 */
        case (3):
                {
                        size_i = &n1;
                        size_j = &n2;
                        size_k = &nz1;
                        t = dic1;
                        break;
                } /* end 3 */
        case (4):
                {
                        size_i = &n1;
                        size_j = &n2;
                        size_k = &np1;
                        t = doc1;
                        break;
                } /* end 4 */
        default:
                {
                        printf ("choices:\n");
                        printf ("1: display input to hidden D_Input_Coefficient\n");
                        printf ("2: display input to hidden D_Output_Coefficient\n");
                        printf ("3: display hidden to output D_Input_Coefficient\n");
                        printf ("4: display hidden to output D_Output_Coefficient\n");
                        goto start;
                } /* end default */
        } /* end switch */
        for (i = 0; i < *size_i; i++)
        {
                printf (" from node %d\n",i);
                for (j = 0; j < *size_j; j++)
                {
                        printf (" to node %d\n", j);
                        for (k = 0; k < *size_k; k++)
                        {
                                printf (" %6.2f", t[i][j][k]);
                                if ((c++%6) == 5)
                                        putchar ('\n');
                        } /* end for k */
                } /* end for j */
        } /* end for i */
        if (!(c%6))
                putchar ('\n');
} /* end print_correction */ void print_weights ()
{
        int c=0, i, j, k, size_i, size_j, size_k1, size_k2;
        float ***t1, ***t2;

printf (" hidden or output weights <h/o> ");
        if (getch() == 'h')
        {
                size_i = n0;
                size_j = n1;
                size_k1 = nz0;
                size_k2 = np0;
                t1 = ic0;
                t2 = oc0;
        } /* end if */
        else
        {
```

```
            size_i = n1;
            size_j = n2;
            size_k1 = nz1;
            size_k2 = np1;
            t1 = ic1;
            t2 = oc1;
    } /* end else */
    for (i = 0; i < size_i; i++)
    {
            printf (" from node %d\n", i);
            for (j = 0; j < size_j; j++)
            {
                    printf (" to node %d\n", j);
                    printf (" input coefficients:\n");
                    for (k = 0; k < size_k1; k++)
                    {
                            printf (" %7.4f", t1[i][j][k]);
                            if ((c++%6)==5)
                                    putchar ('\n');
                    } /* end for k */
                    if (!(c%6))
                            putchar ('\n');

printf (" output coefficients:\n");
                    for (k = 0; k < size_k2; k++)
                    {
                            printf (" %7.4f", t2[i][j][k]);
                            if ((c++%6)==5)
                                    putchar ('\n');
                    } /* end for k */
                    if (!(c%6))
                            putchar('\n');
            } /* end for j */
    } /* end for i */
} /* end print_weights */

/* compute output of filter in response to input x */
/* maintain input_value and output_value arrays which contain */
/* respectively histories of inputs and outputs */
/* starting with the most recent. */

/* compute and accumulate gradient descent vectors d_input_coefficients */
/* and d_output_coefficients for the coefficient arrays */
/* the input parameter is the amount of error to be fed back */
void gradient (d_input_coefficient, input_value,
d_output_coefficient, output_value, NumZeros, NumPoles, dy)
float *d_input_coefficient, *input_value,
*d_output_coefficient, *output_value, dy;
int NumZeros, NumPoles;
{
        int i;

for (i = 0; i < NumZeros; i++)
                d_input_coefficient[i] +=
                        (dy*input_value[i]);
        for (i = 0; i < NumPoles; i++)
                d_output_coefficient[i] +=
                        (dy*output_value[i+1]);
} /* end gradient */

/* correct coefficient vectors from the */
/* descent vectors */
void apply_correction (InputCoefficient, D_InputCoefficient,
OutputCoefficient, D_OutputCoefficient, m_i, m_o, FromNode, ToNode,
NumZeros, NumPoles)
float ***InputCoefficient, ***D_InputCoefficient,
***OutputCoefficient, ***D_OutputCoefficient, ***m_i, ***m_o;
int FromNode, ToNode, NumZeros, NumPoles;
{
        int i;

for (i = 0; i < NumZeros; i++)
        {
                InputCoefficient [FromNode] [ToNode] [i] +=
                        (alpha*(epsilon*D_InputCoefficient [FromNode] [ToNode] [i]+delta*m_i
[FromNode][ToNode][i]));
                m_i[FromNode][ToNode][i] = D_InputCoefficient[FromNode][ToNode][i];
                D_InputCoefficient[FromNode][ToNode][i] = 0.0;
        } /* end for i */
        for (i = 0; i < NumPoles; i++)
        {
                OutputCoefficient [FromNode] [ToNode] [i] +=
                        (alpha*(epsilon*D_OutputCoefficient [FromNode] [ToNode] [i]+delta*m_
o[FromNode][ToNode][i]));
                m_o[FromNode][ToNode][i] = D_OutputCoefficient[FromNode][ToNode][i];
                D_OutputCoefficient[FromNode][ToNode][i] = 0.0;
        } /* end for i */
```

```
} /* end apply_correction */ void PropagateForward (Sample, low, high, NetInput)
float low, high, **NetInput;
int Sample;

{
        int i, In, Hid, Out;
        float t;
        float **iptr, ***optr;

/* clear the hidden layer and output neurons */
        for (Hid = 0; Hid < n1; Hid++)
                nv0[Hid] = 0.0;
        for (Out = 0; Out < n2; Out++)
                nv1[Out] = 0.0;
        /* propagate input to hidden for input sample "Sample" */
        for (In = 0; In < n0; In++)
        {
                for (i = nz0-1; i > 0; i--)
                        iv0[In][i] = iv0[In][i-1];
                iv0[In][0] = NetInput[In][Sample]+frand(low,high);
                for (Hid = 0; Hid < n1; Hid++)
                {
                        t = 0.0;
                        for (i = 0; i < nz0; i++)
                                t+=(iv0[In][i]*ic0[In][Hid][i]);
                        for (i = np0; i > 0; i--)
                                t+=(oc0[In][Hid][i-1]*(ov0[In][Hid][i]-ov0[In][Hid][i-1])
);
                        nv0[Hid]+=t;
                        ov0[In][Hid][0] = t;
                } /* end for Hid */
        } /* end for In */
        for (Hid = 0; Hid < n1; Hid++)
                nv0[Hid] = sigmoid(nv0[Hid]);
        if ( HidFile != NULL)
                {for (Hid = 0; Hid < n1; Hid++)
                fprintf (HidFile, " %8.4f\t", nv0[Hid]);
                fprintf (HidFile, "\n");
                }
        /* propagate hidden to output */
        for (Hid = 0; Hid < n1; Hid++)
        {
                for (i = nz1-1; i > 0; i--)
                        iv1[Hid][i] = iv1[Hid][i-1];
                iv1[Hid][0] = nv0[Hid];
                for (Out = 0; Out < n2; Out++)
                {
                        t = 0;
                        for (i = 0; i < nz1; i++)
                                t+=(ic1[Hid][Out][i]*iv1[Hid][i]);
                        for (i = np1; i > 0; i--)
                                t+=(oc1[Hid][Out][i-1]*(ov1[Hid][Out][i]-ov1[Hid][Out][i-
1]));
                        nv1[Out]+=t;
                        ov1[Hid][Out][0] = t;
                } /* end for Out */
        } /* end for Hid */
        /* compute sigmoid for output layer neurons */
        for (Out = 0; Out < n2; Out++)
                nv1[Out] = sigmoid(nv1[Out]);
        /* Maintain the last nz1 inputs and outputs for input filters */
        iptr = ih0[nz1-1];
        optr = oh0[nz1-1];
        for (i = nz1-1; i > 0; i--)
        {
                ih0[i] = ih0[i-1];
                oh0[i] = oh0[i-1];
        } /* end for i */
        ih0[0] = iptr;
        oh0[0] = optr;
        for (In = 0; In < n0; In++)
        {
                for (i = 0; i < nz0; i++)
                        ih0[0][In][i] = iv0[In][i];
                for (Hid = 0; Hid < n1; Hid++)
                        for (i = 0; i <= np0; i++)
                                oh0[0][In][Hid][i] = ov0[In][Hid][i];
        } /* end for In */
} /* end PropagateForward */ void ComputeError (Sample, dymax, esum)
int Sample;
```

```
float *dymax, *esum;
{
  int Out;
  static float dyabs;
  for (Out = 0; Out < n2; Out++)
    {
      OutError[Out] = TestWaveOut[Out] [Sample] - nv1[Out];
      *esum += (dyabs=fabs(OutError[Out]));
      if (dyabs > *dymax)
        *dymax = dyabs;
    } /* end Out */
} /* end ComputeError */ void PropagateBackward (Sample, dymax, esum)
int Sample;
float *dymax, *esum;
{
        int i, In, Hid, Out;
        static float dyabs;

/* first compute the error at the output layer */
        for (Out = 0; Out < n2; Out++)
        {
                OutError[Out] =
                    WaveOut[Out] [Sample] - nv1[Out] ;
                *esum += (dyabs=fabs(OutError[Out]));
                if (dyabs > *dymax)
                        *dymax = dyabs;
                OutError[Out]*=d_sigmoid(nv1[Out]);
        } /* end for Out */
        /* now compute weight change for neurons in the hidden to output layer
and make the corrections*/
        for (Out = 0; Out < n2; Out++)
                for (Hid = 0; Hid < n1; Hid++)
                        gradient (dic1[Hid][Out], iv1[Hid],
                            doc1[Hid][Out], ov1[Hid][Out],
                            nz1, np1, OutError[Out]);
        for (Out = 0; Out < n2; Out++)
                for (Hid = 0; Hid < n1; Hid++)
                        apply_correction (ic1,
                            dic1,oc1,
                            doc1,mic1, moc1, Hid, Out, nz1,
                            np1);
        for (i = 0; i < nz1; i++)
        {
                for (Hid = 0; Hid < n1; Hid++)
                {
                        HidError[Hid] = 0.0;
                        for (Out = 0; Out < n2; Out++)
                                HidError[Hid]+=(ic1[Hid][Out][i]*OutError[Out]);
                        HidError[Hid]*=d_sigmoid(iv1[Hid][i]);
                        for (In = 0; In < n0; In++)
                                gradient (dic0[In][Hid], ih0[i][In],
                                    doc0[In][Hid], oh0[i][In][Hid],
                                    nz0, np0, HidError[Hid]);
                } /* end for Hid */
        } /* end for i */
        for (In = 0; In < n0; In++)
                for (Hid = 0; Hid < n1; Hid++)
                        apply_correction (ic0,
                            dic0,oc0,
                            doc0,mic0, moc0, In, Hid,
                            nz0, np0);
} /* end PropagateBackward */ void learn ()
{
        int Out, i, j, n = 50, TestNetwork = 50, TestErrNetwork = 10,
            SaveWts = 50;
        float dymax, esum, TestMax, TestSum, high = 0.0, low = 0.0;
        FILE *ErrorFile, *TestFile, *QuikTestFile;
        string WtsFile;

printf (" Filename to store quick test performance results> ");
        if (strlen(gets(str1)))
                QuikTestFile = fopen(str1, "w");
        else
                QuikTestFile = NULL;
        printf (" Filename to store detailed test performance results> ");
        if (strlen(gets(str1)))
                TestFile = fopen(str1, "w");
        else
                TestFile = NULL;
        printf (" File to store error function> ");
```

```
        if (strlen(gets(str1)))
                ErrorFile = fopen(str1, "w");
        else
                ErrorFile = NULL;
        printf (" File to save weights to> ");
        if (strlen(gets(WtsFile)))
            {
            printf ("Periodically save weights every %d passes >", SaveWts);
            sscanf (gets(str1), "%d", &SaveWts);
            } /* end WtsFile */
        get_io ();
        printf (" get weights from file> ");
        if (strlen(gets(str1)))
                get_coefficients(str1);
        printf ("Perform quick network performance test every %d passes> "
                ,TestErrNetwork);
        sscanf (gets(str1), "%d", &TestErrNetwork);
        printf ("Perform detailed network performance test every %d passes (must be multi
ple of quick network test)> " ,TestNetwork);
        sscanf (gets(str1), "%d", &TestNetwork);
        printf (" range for input noise <%6.2f %6.2f> ", low, high);
        sscanf (gets(str1), "%f%f", &low, &high);
        printf (" cycles to process, learning rate and momentum constant <%d %6.4f %6.2f>
",
                n, alpha, delta);
        while (getch() != 'q')
        {
                sscanf (str1, "%d%f%f", &n, &alpha, &delta);
                epsilon = 1.0-delta;
                for (i = 0; i < n; i++)
                {
                  if ( ((i % SaveWts) == 0) && (strlen(WtsFile)))
                    save_coefficients (WtsFile);
                  esum = dymax = 0.0;
                  for (j = 0; j < (NumSamples * NumSets); j++)
                     {
                     if ((j % NumSamples) == 0)
                        reset_network ();
                     PropagateForward (j, low, high, WaveIn);
                     PropagateBackward (j, &dymax, &esum);
                     fflush(ErrorFile);
                     total_cycles++;
                     } /* end for j */
                  if ((TestErrNetwork != 0) && ((i % TestErrNetwork) == 0))
                  {
                  TestMax = TestSum = 0.0;
                  reset_network ();
                  if ((TestFile != NULL) && ((i % TestNetwork) == 0))
                     fprintf(TestFile, "%d \n",i);
                  for (j = 0; j < (NumTestSets * NumTestSamples); j++)
                     {
                     if ((j % NumTestSamples) == 0)
                        reset_network ();
                     PropagateForward(j, low, high, TestWaveIn);
                     ComputeError(j, &TestMax, &TestSum);
                     if ((TestFile != NULL) && ((i % TestNetwork) == 0))
                        {
                        for (Out = 0; Out < n2; Out++)
                          fprintf(TestFile, "%6.2f \t", nv1[Out]);
                        fprintf (TestFile, "\n");
                        }
                     } /* end j */
                  if (QuikTestFile != NULL){
                     fprintf (QuikTestFile, "%d \t %6.2f \t %6.2f \n",
                             i, TestMax,
                             TestSum/(float)(n2*NumTestSamples));
                     fflush (QuikTestFile);
                     } /* end TestFile */
                  } /* end TestNetwork */
                  if (ErrorFile != NULL){
                     fprintf (ErrorFile, " %6.2f \t %6.2f\n",
                             dymax, esum/(float)(n2*NumSamples * NumSets));
                     fflush(ErrorFile);
                  }
                } /* end for i */
                printf ("max error = %6.2f average error = %6.2f\n",
                        dymax, esum/(float)(n2*NumSamples*NumSets));
                printf (" cycles to process, learning rate and momentum constant <%d %6.
4f %6.2f> or <q> to quit >",
                        n, alpha, delta);
        } /* end while */
/*      printf (" save coefficients to file> ");
        if (strlen(gets(str1)))
                save_coefficients (str1); */
        if (ErrorFile != NULL)
                fclose (ErrorFile);
        if (TestFile != NULL)
                fclose (TestFile);
```

} /* end learn */

```c
void PropOnly ()
{
        int i, j, k=0, n = 50;
        float max_error_value, ave_error_value, d;
        float high = 0.0, low = 0.0;
        FILE *ResultsFile, *error_record_file;

printf (" File to store propagation results> ");
        if (strlen(gets(str1)))
                ResultsFile = fopen(str1, "w");
        else
                ResultsFile = NULL;
        printf (" File to record hidden activations? > ");
        if (strlen(gets(str1)))
                HidFile = fopen(str1, "w");
        else
                HidFile = NULL;
        printf (" file to store record of network errors> ");
        if (strlen(gets(str1)))
                error_record_file = fopen(str1, "w");
        else
                error_record_file = NULL;
        get_io ();
        printf (" get weights from file> ");
        if (strlen(gets(str1)))
                get_coefficients(str1);
        printf (" range for input noise <%6.2f %6.2f> ", low, high);
        sscanf (gets(str1), "%f%f", &low, &high);
        if (ResultsFile)
        {
                for (i = 0; i < n0; i++)
                        fprintf(ResultsFile, "\tWaveIn[%d]", i);
                for (i = 0; i < n2; i++)
                        fprintf(ResultsFile, "\tWaveOut[%d]", i);
                fprintf(ResultsFile,"\n\n");
        } /* end if */
        printf (" cycles to process <%d > ",n);
        while (getch() != 'q')
        {
                sscanf (str1, "%d", &n);
                for (i = 0; i < n; i++)
                {
                        for (j = 0; j < (NumSamples * NumSets); j++)
                        {
                                if ((j % NumSamples) == 0)
                                {
                                        if (ResultsFile)
                                                putc('\n', ResultsFile);
                                        reset_network ();
                                } /* end if */
                                PropagateForward (j, low, high, WaveIn);
                                if (ResultsFile !=NULL)
                                {
                                        for (k = 0; k < n0; k++)
                                                fprintf(ResultsFile,"\t %8.4f", WaveIn[k][j]);
                                        for (k = 0; k < n2; k++)
                                                fprintf (ResultsFile, "\t %8.4f", nv1[k]);
                                        putc('\n', ResultsFile);
                                } /* end if */
                                if (error_record_file)
                                {
                                        max_error_value = ave_error_value = 0.0;
                                        for (k = 0; k < n2; k++)
                                        {
                                                if ((d=fabs(WaveOut[k][j]-nv1[k])) > max_error_value)
                                                        max_error_value = d;
                                                ave_error_value+=d;
                                        } /* end for k */
                                        ave_error_value/=n2;
                                        fprintf (error_record_file,"%f\t%f\n",max_error_value, ave_error_value);
                                } /* end if */
                        } /* end for j */ if (ResultsFile)
                                putc('\n', ResultsFile);
```

```c
            } /* end for i */
            printf (" cycles to process<%d> or <q> to quit> ", n);
        } /* end while */
        if (MidFile)
            fclose (MidFile);
        if (ResultsFile)
            fclose (ResultsFile);
        if (error_record_file)
            fclose (error_record_file);
} /* end PropOnly */

/* void impulse ()
{
int i, n;
float *temp, *FFTReal, *FFTImaginary, result;
FILE *f;

init_trig (FFTSize);
FFTReal = (float*)mem_alloc(FFTSize*sizeof(float));
FFTImaginary = (float*)mem_alloc(FFTSize*sizeof(float));
printf ("Enter layer designation < 0- Hidden Layer, 1-Output Layer>");
printf (" value of initial impulse> ");
input_value[0] = atof(gets(str1));
printf ("Spectral Impulse Response file name> ");
if (strlen(gets(str1)))
f = fopen(str1, "w");
printf (" periods to propagate inpulse> ");
n = atoi (gets(str1));
ResetNetwork ();
while (getch() != 'q')
{
if (str1[0] == '0')
{
fprintf(f, "Input To Hidden Spectral Impulse Response");
for (Mid = 0; Mid < n1; Mid++)
{
fprintf("Spectral Impulse response for hidden node %d", Mid);
for (i = 0; i < FFTSize; i++)
FFTReal[i] = FFTImaginary[i] = 0.0;
for (In = 0; In < n0; In++)
for (pulse = 0; pulse < n; pulse++)
FFTReal[(FFTSize/2)+pulse] +=
new_output (ic0, iv0,
ec0,ev0,
In, Mid, ns0, np0,
input_value[pulse]);
for (i = FFTSize/2, n = (FFTSize/2)-1; i < FFTSize; i++, n--)
FFTReal[n] = FFTReal[i];
fft1(FFTReal, FFTImaginary, FFTSize, 7);
for (i = 0; i < FFTSize; i++)
fprintf(f, " %10.2f \n",
sqrt(FFTReal[i]*FFTReal[i] + FFTImaginary[i]*FFTImaginary[i]));
}
}
else
if (str1[0] == '1')
MidToOutImp ();
else
if (str1[0] == '2')
AllNetImp ();
MainMenu();

temp = (float*)mem_alloc((num_inp_coeff+num_poles+1)*sizeof(float));
for (i = 0; i < FFTSize; i++)
FFTReal[i] = FFTImaginary[i] = 0.0;
for (i = 0; i < num_inp_coeff; i++)
{
temp[i] = input_value[i];
input_value[i] = 0.0;
}
for (i = 0; i <= num_poles; i++)
{
temp[i+num_inp_coeff] = output_value[i];
output_value[i] = 0.0;
} printf ("Spectral Impulse Response file name> ");
if (strlen(gets(str1)))
{
f = fopen(str1, "w");
```

```
printf (" periods to propagate impulse> ");
n = atoi (gets(strl));
fprintf (f, "Impulse response\n");
for (i = 0; i < n; i++)
{
fprintf (f, " %10.2f\n", result=new_output(0.0));
FFTReal[(FFTSize/2)+i] = result;
}
} for (i = FFTSize/2, n = (FFTSize/2)-1; i < FFTSize; i++, n--)
FFTReal[n] = FFTReal[i];
fft1(FFTReal, FFTImaginary, FFTSize, 7);
fprintf (f, "Fourier Transform of Impulse Response\n");
for (i = 0; i < FFTSize; i++)
fprintf(f, "%10.2f \t %10.2f \t %10.2f \n",FFTReal[i], FFTImaginary[i],
sqrt(FFTReal[i]*FFTReal[i] + FFTImaginary[i]*FFTImaginary[i]));

for (i = 0; i < num_inp_coeff; i++)
input_value[i] = temp[i];
for (i = 0; i <= num_poles; i++)
output_value[i] = temp[i+num_inp_coeff];
free (temp);
free (FFTReal);

free (FFTImaginary);
fclose (f);
printf (" option> ");
} */ void MainMenu ()
{
        printf ("\nMENU");
        printf ("\nlearn from training file <l>");
        printf ("\npropagate from file <p>");
        /* printf ("\nspectral impulse response<i>"); */
        printf ("\ndo nothing - quit<q>");
        printf ("\naction? >");
} main ()
{ allocate_network ();
        MainMenu ();
        while (getch() != 'q')
        {
                if (strl[0] == 'l')
                        learn ();
                else
                        if (strl[0] == 'p')
                                PropOnly ();
                        else
                            /* if (strl[0] == 'i')
impulse (); */
                                MainMenu();
        }/* end while */
} /* end main */
```

What is claimed is:

1. A processing element (i) for use in a space-time neural network for processing both spacial and temporal data, wherein the neural network comprises a plurality of layers of said processing elements, the plurality of layers comprising a first layer and at least one additional layer, the network further comprising connections between processing elements of the first layer and processing elements of an additional layer: each said processing element adapted to receive a sequence of signal inputs X(n), X(n−1), X(n−2)..., each input X(n) comprising K signal components $x_1(n)$, $x_2(n)$, ... $x_j(n)$, ... $x_k(n)$, each said processing element comprising, in combination:

(a) a plurality K of adaptable filters ($F_{1i}$, $F_{2i}$, ... $F_{ji}$, ... $F_{ki}$) each filter $F_{ji}$ having an input for receiving a respective component $x_j(n)$, $x_j(n-1)$, $x_j(n-2)$, ..., of said sequence of inputs, where $x_j(n)$ is the most current input component, and providing a filter output $y_j(n)$ in response to the input $x_j(n)$ which is given by:

$$y_j(n) = f(a_{mj} Y_j(n-m), b_{kj} X_j(n-k)),$$

where $a_{mj}$ and $b_{kj}$ are coefficients of the filter $F_{ji}$ and f denotes the operation of the filter;

(b) a junction, coupled to each of said adaptive filters, providing a non-linear output $p_i(S_i(n))$ in response to the filter outputs $y_j(n)$ which is given by:

$$p_i(S_i(n)) = f(y_j(n)),$$

where $S_i(n)$ is the sum of the filter outputs,
whereby said junction presents a sequence of output signals, $p_i(S_i(n))$, $p_i(S_i(n-1))$, $p_i(S_i(n-2))$.

2. The processing element defined in claim 1, wherein said non-linear output provided by said junction is the sum $S_i(n)$ of the filter outputs modified by a non-linear transformation $p_i(S_i(n))$ to the sum $S_i(n)$, where $S_i(n)$ is given by:

$$S_i(n) = \Sigma_j y_j(n).$$

3. The processing element defined in claim 2, wherein the non-linear transformation is a sigmoid transfer function given by:

$$p_i(S_i(n)) = 1/(1 + e - S_i(n)).$$

4. The processing element defined in claim 1, wherein said filters are non-linear filters.

5. The processing element defined in claim 4, wherein said non-linear filters are exponential auto-regressive filters.

6. The processing element defined in claim 1, wherein the coefficients $a_{mj}$ and $b_{kj}$ of each filter $F_{ji}$ are adjustable.

7. The processing element defined in claim 1, wherein said adaptable filters are digital filters.

8. The processing element defined in claim 7, wherein said filters are linear filters.

9. The processing element defined in claim 8, wherein said filters are recursive, infinite impulse response filters and wherein the response of each filter is given by:

$$y_j(n) = \sum_{m=1}^{M} a_m y_j(n-m).$$

10. The processing element defined in claim 8, wherein said filters are nonrecursive finite impulse response filters and wherein the response of each filter is given by:

$$y_j(n) = \sum_{k=0}^{N} b_k x_j(n-k).$$

11. The processing element defined in claim 8, wherein the response of each filter is given by:

$$y_j(n) = \sum_{m=1}^{M} a_m y_j(n-m) + \sum_{k=0}^{N} b_k x_j(n-k).$$

12. The processing element defined in claim 11, further comprising means for adjusting the coefficients $a_{mj}$ and $b_{kj}$ of each filter $F_{ji}$ in dependence upon the junction output $p_i(S_i(n))$.

13. The processing element defined in claim 12, wherein said adjusting means includes means for determining an error in the output $p_i(S_i(n))$ between the actual and desired response of the processing element (i) and adjusting the filter coefficients $a_{mj}$ and $b_{kj}$ of each filter $F_{ji}$ in dependence upon said error.

14. The processing element defined in claim 13, wherein the non-linear transformation is a sigmoid transfer function with output $p_i(S_i(n))$ given by:

$$p_i(S_i(n)) = 1/(1 + e - S_i(n)).$$

15. The processing element defined in claim 14, wherein said error $\Delta_i(n)$ is given by:

$$\Delta_i(n) = (D_i(n) - A_i(n)) p'(S_i(n))$$

where:
$D_i(n)$ is the nth desired response from a given sequence for neuron i at the output layer
$A_i(n)$ is the network's output response i for the nth input sequence pattern
$p'(S_i(n))$ is the first derivative of $p_i(S_i(n))$, the non-linear transfer function for the ith output's activation value or in the case of said sigmoid non-linear transfer function, $p'(S_i(n))$ is given by:

$$p'(S_i(n)) = p_i(S_i(n))(1 - p_i(S_i(n))).$$

16. The processing element defined in claim 15, wherein said filter coefficient $b_{ijk}$ is adjusted in accordance with the formula:

$$\Delta b_{ijk} = \alpha[\eta \Delta b_{ijk}^{old} + (1-\eta) \Delta_i(n) x_j(n-k)]$$

where:
$\Delta b_{ijk}$ is the update for a zero coefficient, $b_{ijk}$, lying between processing elements i and j
$\alpha$ is the learning rate of the neural network
$\Delta b_{ijk}^{old}$ is the most recent update for the kth zero element between processing elements i and j
$\eta$ damps the most recent update
$X_j(n-k)$ is the output of the jth neuron in the hidden layer.

17. The processing element defined in claim 15, wherein said filter coefficient $a_{ijk}$ is adjusted in accordance with the formula:

$$\Delta a_{ijk} = \alpha[\eta \Delta a_{ijk}^{old} + 1 - \eta) \Delta_i(n) y_i(n-k)]$$

where:
$\Delta a_{ijk}$ is the update for a pole coefficient, $a_{ijk}$, lying between processing elements i and j
$\alpha$ is the learning rate of the neural network
$\Delta a_{ijk}^{old}$ is the most recent update for the kth pole coefficient between processing elements i and j
$\eta$ damps the most recent update
$y_i(n-k)$ is the activation value for the filter elements between neurons i and j, k time steps ago.

18. The processing element defined in claim 15, wherein said filter coefficients $a_{ijk}$ and $b_{ijk}$ are adjusted in accordance with the formula:

$$\Delta b_{ijk} = \alpha[\eta \Delta b_{ijk}^{old} + (1-\eta) \Delta_i(n) x_j(n-k)]$$

$$\Delta a_{ijk} = \alpha[\eta \Delta a_{ijk}^{old} + (1-\eta) \Delta_i(n) y_{ij}(n-k)]$$

where:

$\Delta a_{ijk}$ is the update for a pole coefficient $a_{ijk}$ lying between processing elements i and j $\Delta b_{ijk}$ is the update for a zero coefficient $b_{ijk}$ lying between processing elements i and j $\alpha$ is the learning rate of the neural network $\Delta b_{ijk}^{old}$ is the most recent update for the kth zero element between processing elements i and j $\eta$ damps the most recent update $\Delta a_{ijk}^{old}$ is the most recent update for the kth pole element between processing elements i and j $x_j(n-k)$ is the output of the jth neuron k time steps ago $y_{ij}(n-k)$ is the activation value for the filter element between neurons i and j, k time steps ago.

19. A neural network for processing both spacial and temporal data, wherein said neural network comprises a plurality of layers of processing elements, the plurality of layers comprising a first layer and a second layer, the network further comprising connections between processing elements of the first layer and processing elements of the second layer; said first layer of said network adapted to receive a sequence of signal inputs $X(n), X(n-1), X(n-2)\ldots$, each input $X(n)$ comprising N signal components $x_1(n), x_2(n), \ldots x_j(n), \ldots x_N(n)$, said first layer of said network comprising, in combination:

(a) a plurality L of first processing elements, each first processing element (i) comprising a plurality N of adaptable filters $(F_{1i}, F_{2i}, \ldots F_{ji}, \ldots F_{Ni})$, each filter $F_{ji}$ having an input for receiving a respective component $x_j(n), x_j(n-1), x_j(n-2), \ldots$, of said sequence of inputs, where $x_j(n)$ is the current input component, and providing a filter output $y_j(n)$ in response to an input $x_j(n)$ which is given by:

$$y_j(n) = f(a_{mj}y_j(n-m), b_{kj}x_j(n-k)),$$

where $a_{mj}$ and $b_{kj}$ are coefficients of the filter $F_{ji}$ and f denotes the action of the filter;

each first processing element (i) further comprising a first junction, coupled to each of said adaptive filters, providing a non-linear output $p_i(S_i(n))$ in response to the filter outputs $y_j(n)$ which is given by:

$$p_i(S_i(n)) = f(y_j(n)),$$

where $S_i(n)$ is the sum of the filter outputs, each first junction presenting a sequence of first output signals, $p_i(S_i(n)), p_i(n-1)), p_i(S_i(n-2)), \ldots$ 20. The neural network defined in claim 19, wherein said second layer comprises:

a plurality of M of second processing elements (k) each coupled to a plurality of said first junctions, each second processing element comprising a plurality O of adaptable filters $(F_{1k}, F_{2k}, \ldots F_{hk}, \ldots F_{Ok})$, each connected to one of said first junctions, each filter $F_{hk}$ having an input for receiving a respective first junction output signal $S_k(n), S_k(n-1), S_k(n-2), \ldots$, of said sequence of first junction output signals, where $S_k(n)$ is the most current output signal, and providing a filter output, $y_h(n)$, in response to an input $S_k(n)$ which is given by:

$$y_j(n) = f(C_{qk}Y_h(n-l)), d_{rk}p_k(S_k(n-r)),$$

where $C_{qk}$ and $d_{rk}$ are coefficients of the filter $F_{hk}$ and f denotes the action of the filter;

each second processing element (k) further comprising a second junction, coupled to each of said second adaptive filters of the respective second processing element and providing a non-linear output $p_g(S_g(n))$ in response to the filter outputs $y_h(n)$ which is given by:

$$p_g(S_g(n)) = f(y_h(n)),$$

where $S_g(n)$ is the sum of said second filter outputs, each second junction presenting a sequence of second output signals $p_g(S_g(n)), p_g(S_g(n-1)), p_g(S_g(n-2)), \ldots$ 21. The network defined in claim 20, wherein said non-linear outputs provided by said junctions are a sum $S_g(n)$ of the filter outputs modified by an arbitrary non-linear transformation $p_g(S_g(n))$ to the sum $S_g(n)$, where $S_g(n)$ is given by:

$$S_g(n) = \sum_h y_h(n).$$

22. The network defined in claim 21, wherein the non-linear transformation is a sigmoid transfer function given by:
$$p_i(S_i(n)) = 1/(1 + e - S_i(n)).$$

23. The network defined in claim 20, wherein said filters are non-linear filters.

24. The network defined in claim 23, wherein said non-linear filters are exponential auto-regressive filters.

25. The network defined in claim 20, wherein said adaptable filters are digital filters.

26. The network defined in claim 25, wherein said filters are linear filters.

27. The network defined in claim 26, wherein said filters are recursive, infinite impulse response filters and wherein the response of each filter is given by:

$$y_j(n) = \sum_{m=1}^{M} c_{mj}y_j(n-m).$$

28. The network defined in claim 26, wherein said filters are non-recursive finite impulse response filters and wherein the response of each filter is given by:

$$y_j(n) = \sum_{k=0}^{N} d_{kj}x_j(n-k).$$

29. The network defined in claim 26, wherein the response of each filter is given by:

$$y_j(n) = \sum_{m=1}^{M} c_{mj}y_j(n-m) + \sum_{k=0}^{N} d_{kj}x_j(n-k).$$

30. The network defined in claim 29, wherein the coefficients $c_{mj}$ and $d_{kj}$ of each filter $F_{ji}$ are adjustable.

31. The network defined in claim 29, further comprising means for adjusting the coefficients $c_{mj}$ and $d_{kj}$ of each filter $F_{ji}$ in dependence upon the plurality N of junction outputs $p_g(S_g(n))$.

32. The network defined in claim 31, wherein said adjusting means includes means for determining and error in said outputs $p_g(S_g(n))$ between the actual and desired response of the network and adjusting the filter coefficients $c_{mj}$ and $d_{kj}$ of each filter $F_{ji}$ in dependence upon said error.

33. The network defined in claim 32, wherein the non-linear transformation is a sigmoid transfer function given by:

$$p_g(S_g(n)) = 1/(1 + e - S_g(n)).$$

34. The network defined in claim 33, wherein said error is given by:

$$\delta_g = (D_g(n) - A_g(n)) \, p'(S_g(n))$$

where:
$D_g(n)$ is the nth desired response from a given sequence for neuron g at the output layer
$A_g(n)$ is the network's output response at neuron g for the nth input sequence pattern
$p'(S_g(n))$ is the first derivative of the non-linear transfer function for the gth output's activation value or in the case of said sigmoid non-linear transfer function, $p'(S_g(n))$ is given by $$p'(S_g(n)) = p(S_g(n)) \, (1 - p(S_g(n))).$$

35. The network defined in claim 34, wherein the kth zero coefficient $d_{ijk}$ of the filter between first processing element j and second processing element i is adjusted in accordance with the formula:

$$\Delta d_{ijk} = \alpha[\eta \Delta d_{ijk}^{old} + (1-\eta) \, \Delta_i x_j(n-k)]$$

where:
$\Delta d_{ijk}$ is the update for a zero coefficient, $d_{ijk}$, lying between first processing element j and second processing element i
$\alpha$ is the learning rate of the neural network
$\Delta d_{ijk}^{old}$ is the most recent update for the kth zero coefficient between first processing element j and second processing element i
$\eta$ damps the most recent update
$x_j(n-k)$ is the output of the jth first processing element k time steps in the past.

36. The network defined in claim 34, wherein the kth pole coefficient for said filter between first processing element j and second processing element i, $c_{ijk}$, is adjusted in accordance with the formula:

$$\Delta c_{ijk} = \alpha[\eta \Delta c_{ijk}^{old} + (1-\eta) \, \Delta_i y_{ij}(n-k)]$$

where
$\Delta c_{ijk}$ is the update for the kth pole coefficient, $c_{ijk}$, lying between first processing element j and second processing element i
$\alpha$ is the learning rate of the neural network
$\Delta c_{ijk}^{old}$ is the most recent update for the kth pole coefficient between first processing element j and second processing element i
$\eta$ damps the most recent update
$y_{ij}(n-k)$ is the activation value for the filter element between first processing element j and second processing element i, k time steps in the past.

37. The network defined in claim 34 wherein said filter coefficients $c_{ijk}$ and $d_{ijk}$ are adjusted in accordance with the formulae:

$$\Delta d_{ijk} = \alpha[\eta \Delta d_{ijk}^{old} + (1-\eta) \, \Delta_i x_j(n-k)]$$

$$\Delta c_{ijk} = \alpha[\eta \Delta c_{ijk}^{old} + (1-\eta) \, \Delta_i y_{ij}(n-k)]$$

where:
$\Delta c_{ijk}$ is the update for the kth pole coefficient $c_{ijk}$ lying between first processing element j and second processing element i
$\Delta d_{ijk}$ is the update for the kth pole coefficient $d_{ijk}$ lying between first processing element j and second processing element i
$\alpha$ is the learning rate of the neural network
$\Delta d_{ijk}^{old}$ is the most recent update for the kth zero element between first processing element j and second processing element i
$\eta$ damps the most recent update
$\Delta c_{ijk}^{old}$ is the most recent update for the kth zero element between first processing element j and second processing element i
$x_j(n-k)$ is the output of the jth first processing element k time steps in the past
$y_{ij}(n-k)$ is the activation value for the filter element between first processing element j and second processing element i, k time steps in the past.

38. The network defined in claim 34, wherein the kth pole coefficient for said filter between network input element j and first processing element i, $a_{ijk}$, is adjusted in accordance with the formula:

$$\Delta a_{ijk} = \alpha[\eta \Delta a_{ijk}^{old} + (1-\eta) \epsilon_i y_{ij}(n-k)]$$

where
$\Delta a_{ijk}$ is the update for the kth pole coefficient, $a_{ijk}$, lying between network input element j and first processing element i
$\alpha$ is the learning rate of the neural network
$\Delta a_{ijk}^{old}$ is the most recent update for the kth pole coefficient between network input element j and first processing element i
$\epsilon_i$ is the backpropagated network error at the ith first processing element
$\eta$ damps the most recent update
$y_{ij}(n-k)$ is the activation value for the filter element between network input element j and first processing element i, k time steps in the past.

39. The network defined in claim 34 wherein said filter coefficients $a_{ijk}$ and $b_{ijk}$ are adjusted in accordance with the formulae:

$$\Delta b_{ijk} = \alpha[\eta \Delta b_{ijk}^{old} + (1-\eta) \epsilon_i x_j(n-k)]$$

$$\Delta a_{ijk} = \alpha[\eta \Delta a_{ijk}^{old} + (1-\eta) \epsilon_i y_{ij}(n-k)]$$

where:
$\Delta a_{ijk}$ is the update for the kth pole coefficient $a_{ijk}$ lying between network input element j and first processing element i
$\Delta b_{ijk}$ is the update for the kth zero coefficient $b_{ijk}$ lying between network input element j and first processing element i
$\epsilon_i$ is the backpropagated network error at the ith first processing element
$\alpha$ is the learning rate of the neural network
$\Delta b_{ijk}^{old}$ is the most recent update for the kth zero element between network input element j and first processing element i
$\eta$ damps the most recent update
$\Delta a_{ijk}^{old}$ is the most recent update for the kth pole coefficient of the filter between network input element j and first processing element i
$x_j(n-k)$ is the jth network input k time steps in the past $y_{ij}(n-k)$ is the activation value for the filter element between network input element j and first processing element i, k time steps in the past.

40. The network defined in claim 34, wherein the kth zero coefficient $b_{ijk}$ of the filter between network input element j and first processing element i is adjusted in accordance with the formula:

$$\Delta b_{ijk} = \alpha[\eta \Delta b_{ijk}^{old} + (1-\eta)\epsilon_i x_j(n-k)]$$

where:

$\Delta b_{ijk}$ is the update for a zero coefficient, $b_{ijk}$, lying between network input element j and first processing element i $\epsilon_i$ is the backpropagated network error at the ith first processing element $\alpha$ is the learning rate of the neural network $\Delta b_{ijk}^{old}$ is the most recent update for the kth zero coefficient between network input element j and first processing element i $\eta$ damps the most recent update $x_j(n-k)$ is the jth network input k time steps in the past.

41. The network described in claim 33, further comprising a means for propagating the error $\Delta_g(n)$ measured at the outputs of the gth second processing element backward through the intervening filter connections between first and second processing elements thereby to provide a means for adjusting the coefficients of the filters which connect the inputs of the network to the first processing elements.

42. The network defined in claim 38, wherein said means for backward propagation of error is described by the formula:

$$\epsilon_i(n) = p'_i(S_i(n)) \left[ \sum_j \sum_{k=0}^{T} d_{jik}\Delta_j(n+k) + \sum_j \sum_{k=1}^{U} c_{jik}\gamma_{ij}(n-k) \right]$$

where $\epsilon_i(n)$ is the result of backward propagation of network error from the outputs of all second processing element through the filters between first processing element i and the plurality N of second processing elements $c_{jik}$ is the kth pole coefficient of the filter between first processing element i and second processing element j $d_{jik}$ is the kth zero coefficient of the filter between first processing element i and second processing element j T and U are respectively the non-recursive and recursive orders of the filter through which back-propagation occurs $\Delta_j(n+k)$ is the error computed at the output of the jth second processing element k time steps in the future $\gamma_{ij}(n-k)$ is the output from k time steps in the past of the filter operating on the inverted sequence of network errors.

* * * * *